(12) United States Patent
Tomioka et al.

(10) Patent No.: US 10,295,780 B2
(45) Date of Patent: May 21, 2019

(54) IMAGING LENS AND IMAGING APPARATUS

(71) Applicant: FUJIFILM Corporation, Tokyo (JP)

(72) Inventors: Ryoko Tomioka, Saitama (JP); Daiki Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/906,055

(22) Filed: Feb. 27, 2018

(65) Prior Publication Data
US 2018/0246292 A1    Aug. 30, 2018

(30) Foreign Application Priority Data
Feb. 28, 2017    (JP) .................................. 2017-036188

(51) Int. Cl.
G02B 3/02    (2006.01)
G02B 7/04    (2006.01)
G02B 27/64    (2006.01)
G02B 13/00    (2006.01)
G02B 15/173    (2006.01)

(52) U.S. Cl.
CPC ........... G02B 7/04 (2013.01); G02B 13/0045 (2013.01); G02B 15/173 (2013.01); G02B 27/646 (2013.01)

(58) Field of Classification Search
CPC ........................................................ G02B 7/04
USPC ........................................................ 359/708
See application file for complete search history.

(56) References Cited

U.S. PATENT DOCUMENTS

2010/0165476 A1*    7/2010    Eguchi .................. G02B 13/04
                                                                359/680

FOREIGN PATENT DOCUMENTS

JP    2001-272601 A    10/2001

\* cited by examiner

*Primary Examiner* — James C. Jones
(74) *Attorney, Agent, or Firm* — Studebaker & Brackett PC

(57) ABSTRACT

The imaging lens consists of a positive first lens group remaining stationary during focusing, a negative second lens group, a positive third lens group, and a negative fourth lens group remaining stationary during focusing, in order from an object side. During focusing from the infinite object to the closest object, the second lens group moves to an image side, the third lens group moves to the object side, and the fourth lens group consists of a fourth-a lens group which is a vibration-proof lens group and a fourth-b lens group, in order from the object side. In the imaging lens, predetermined conditional expressions are satisfied.

19 Claims, 33 Drawing Sheets

EXAMPLE 1

FIG. 1
EXAMPLE 1
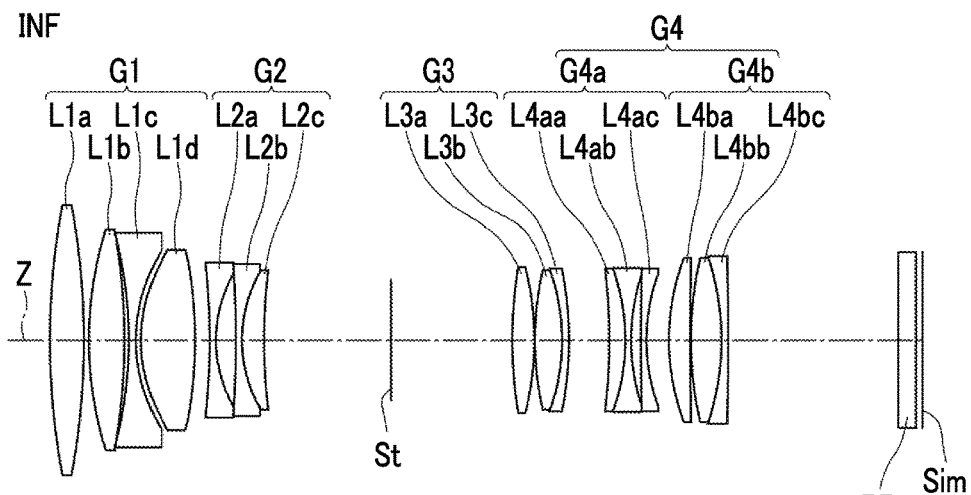
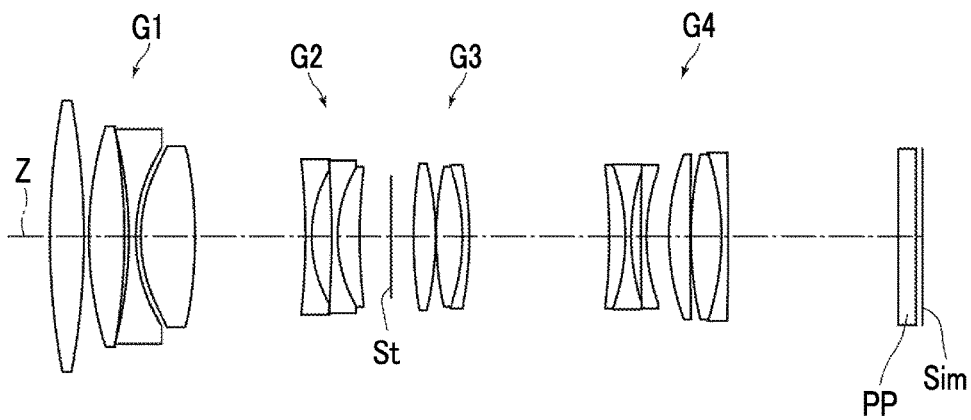

FIG. 2
EXAMPLE 2
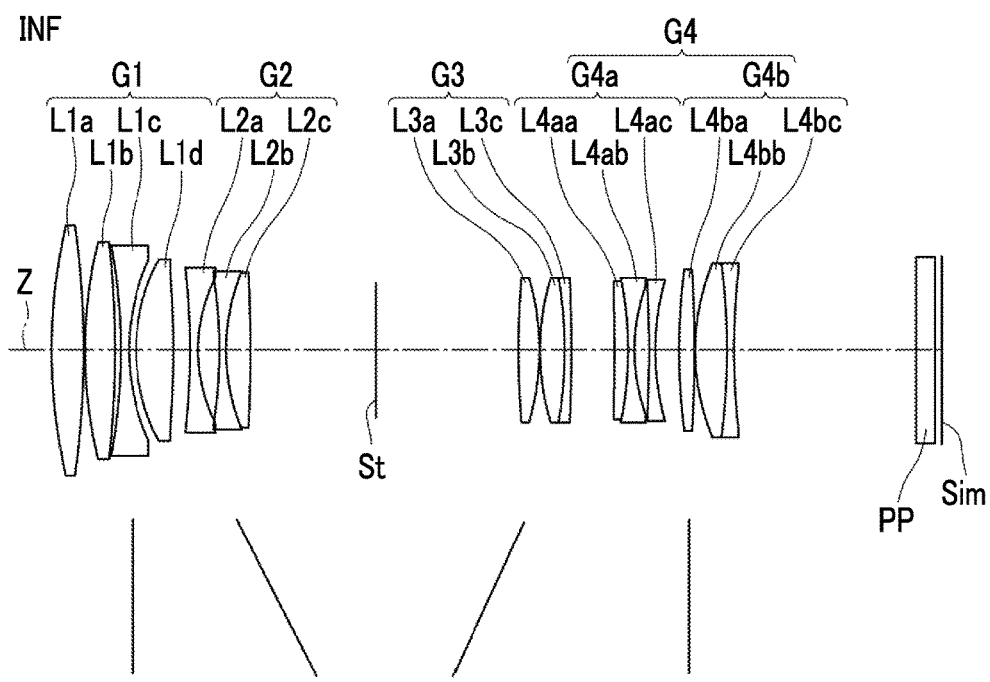
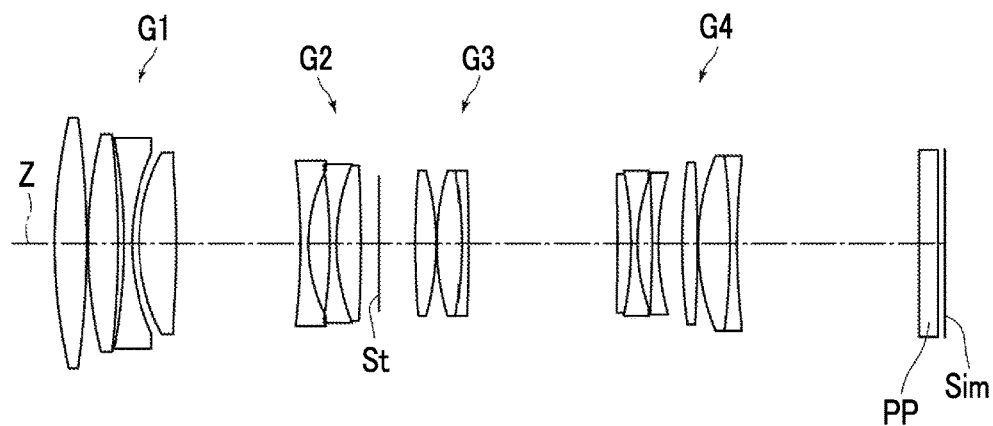

FIG. 3
EXAMPLE 3
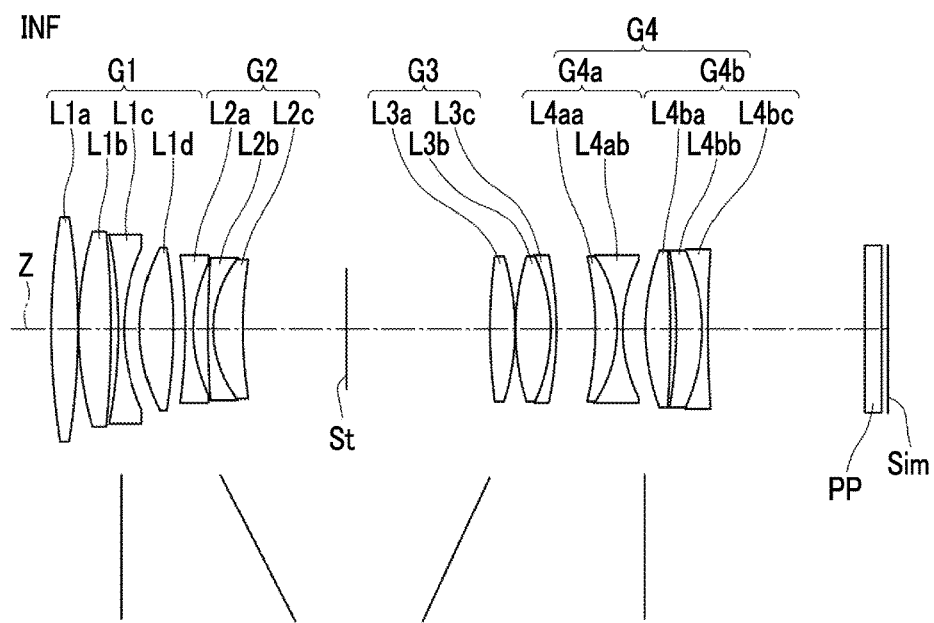
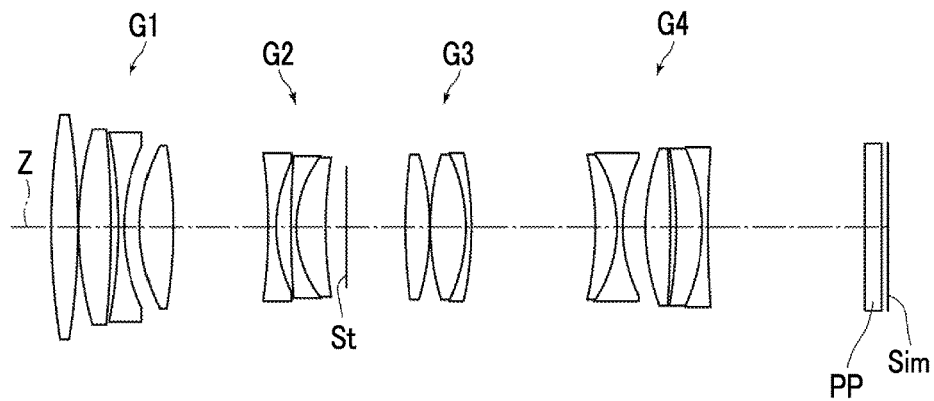

FIG. 4
EXAMPLE 4
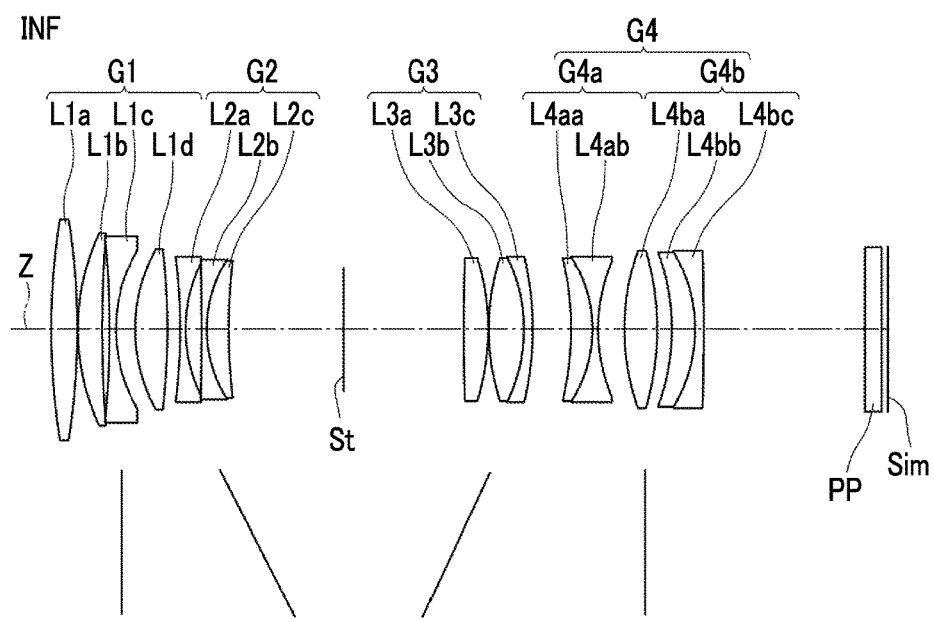
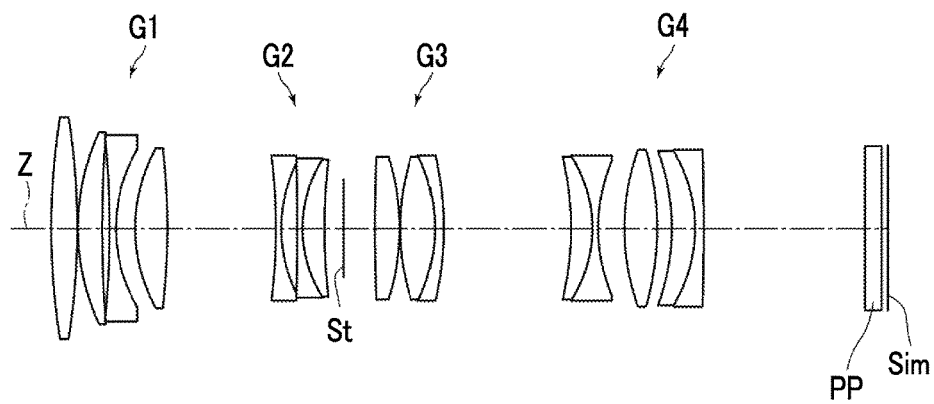

FIG. 5
EXAMPLE 5
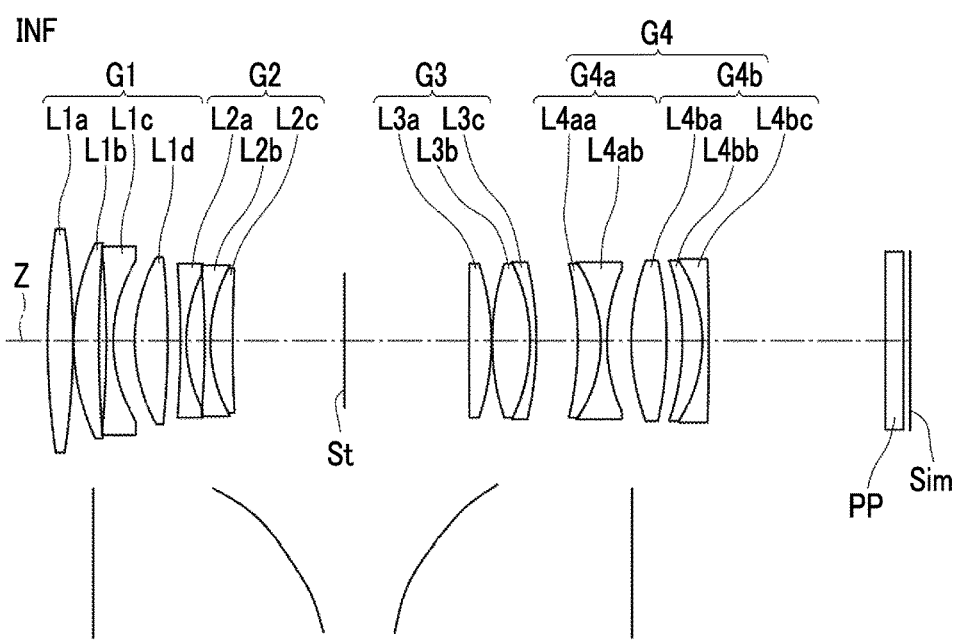
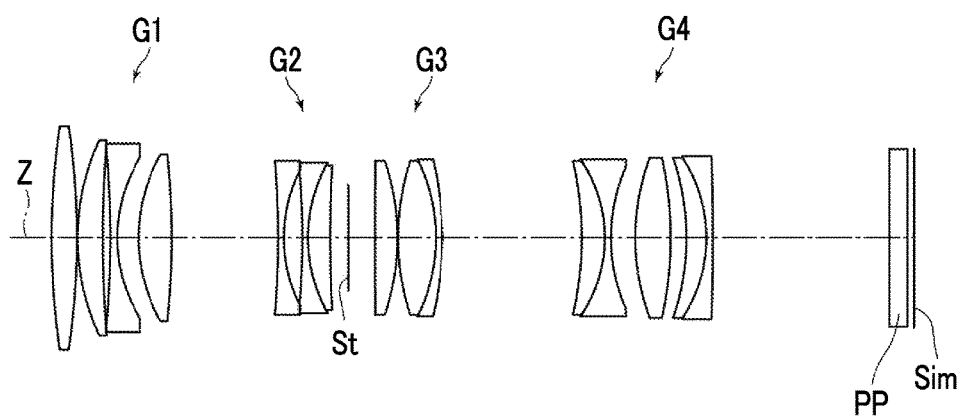

FIG. 6
EXAMPLE 6
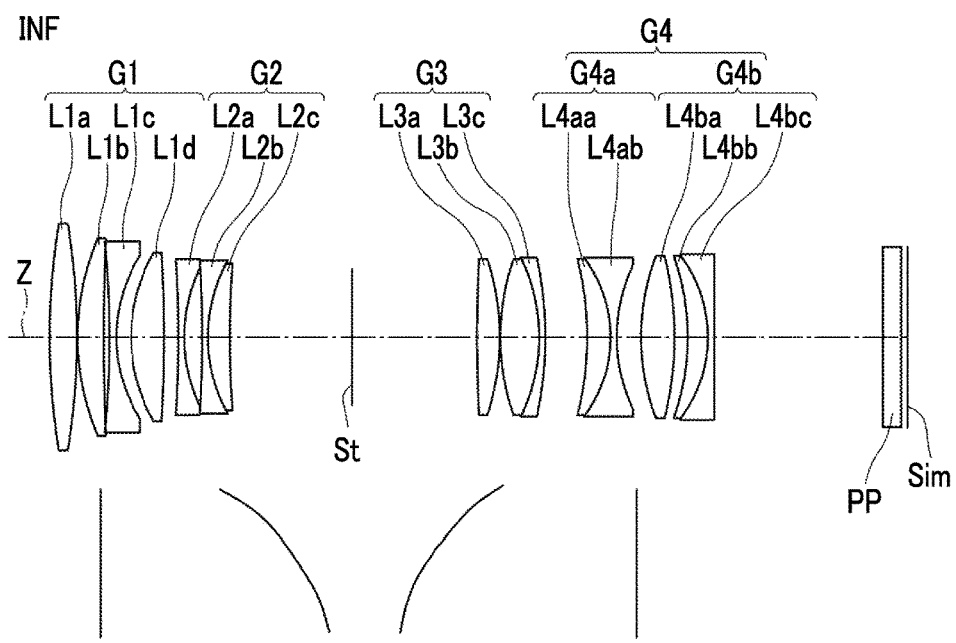
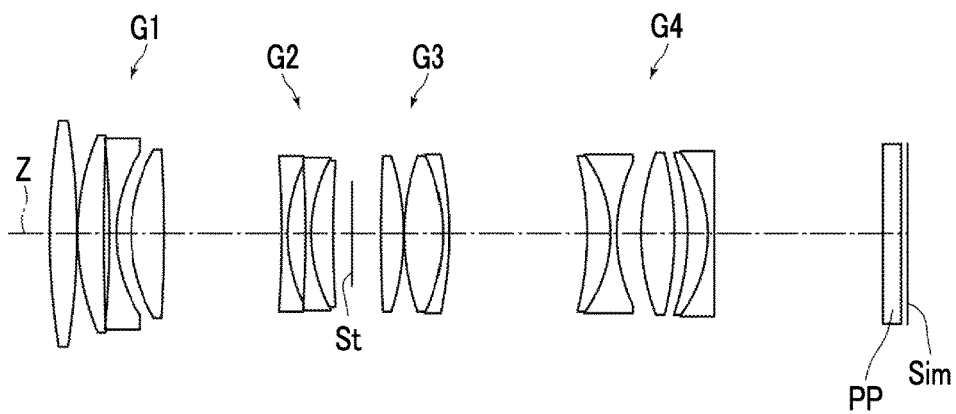

EXAMPLE 2

FIG. 18
EXAMPLE 1
*INF DURING MOVEMENT OF VIBRATION-PROOF LENS GROUP EQUIVALENT TO ANGLE OF 0.3
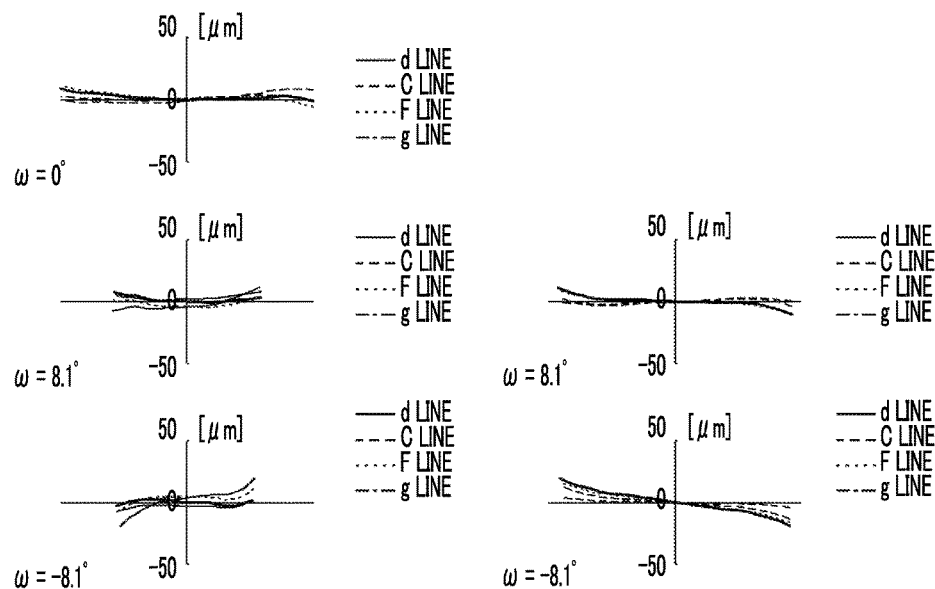
$\beta = -1.0$ DURING MOVEMENT OF VIBRATION-PROOF LENS GROUP EQUIVALENT TO ANGLE OF 0.3
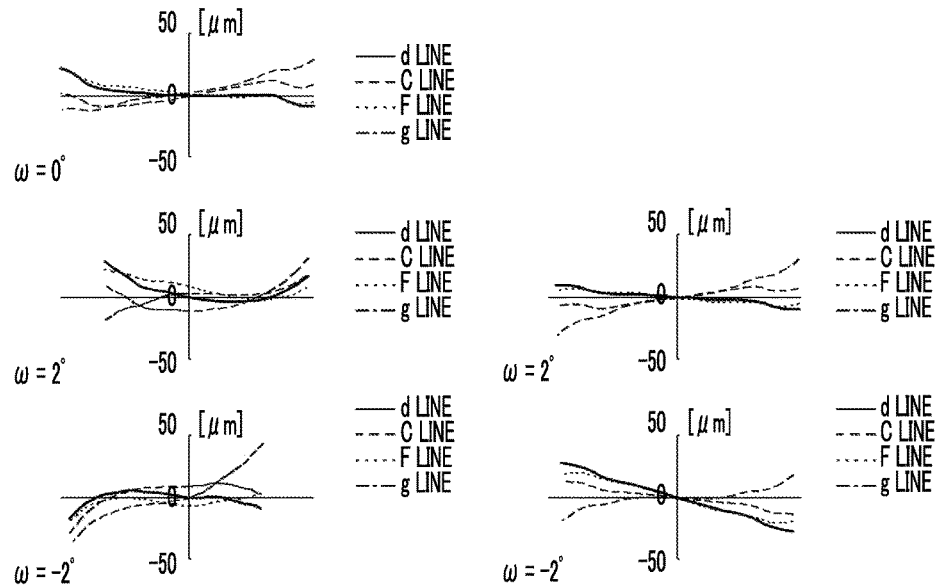

EXAMPLE 2

FIG. 20
EXAMPLE 2
*INF DURING MOVEMENT OF VIBRATION-PROOF LENS GROUP EQUIVALENT TO ANGLE OF 0.3
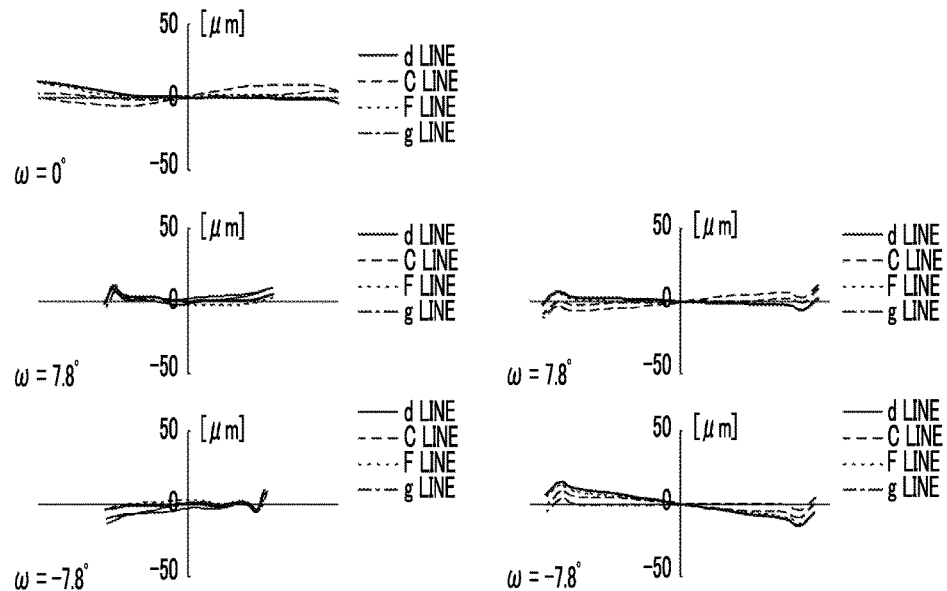
$\beta$ =-1.0 DURING MOVEMENT OF VIBRATION-PROOF LENS GROUP EQUIVALENT TO ANGLE OF 0.3
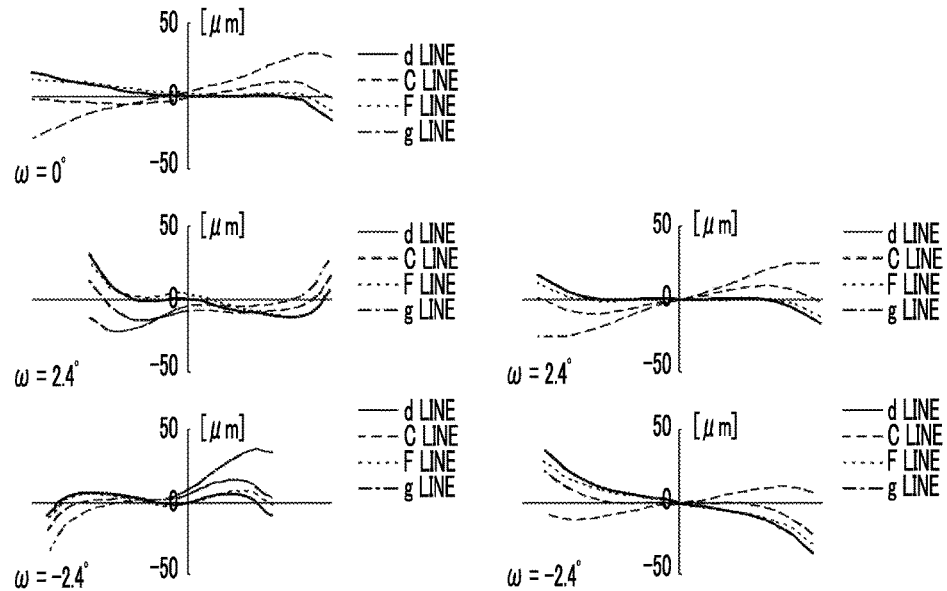

FIG. 22
EXAMPLE 3
*INF DURING MOVEMENT OF VIBRATION-PROOF LENS GROUP EQUIVALENT TO ANGLE OF 0.3
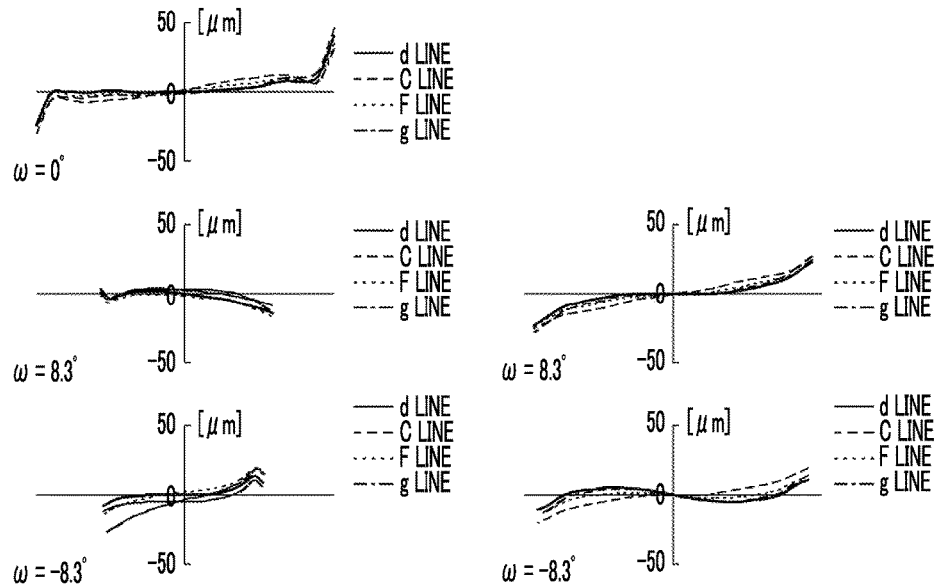
$\beta$ =-1.0 DURING MOVEMENT OF VIBRATION-PROOF LENS GROUP EQUIVALENT TO ANGLE OF 0.3
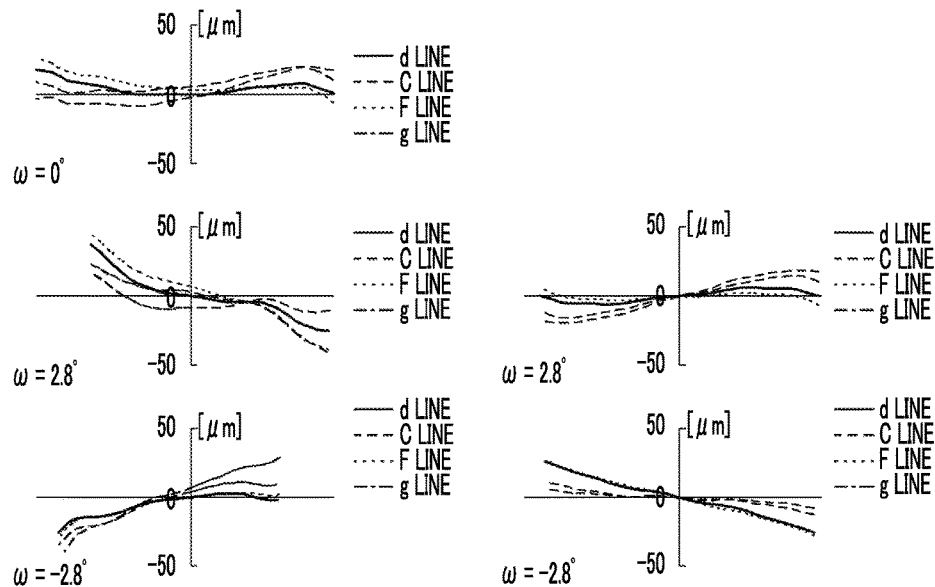

FIG. 24
EXAMPLE 4
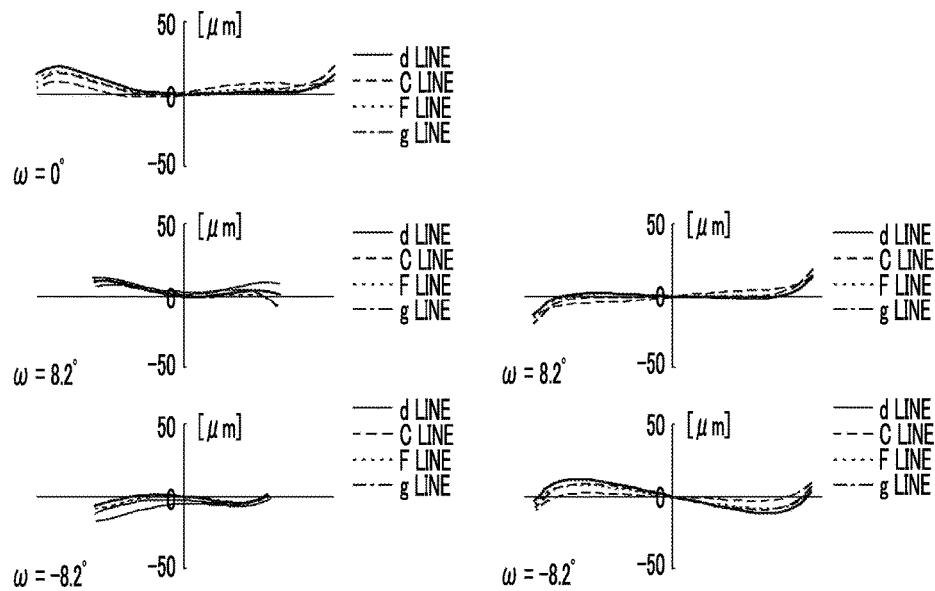
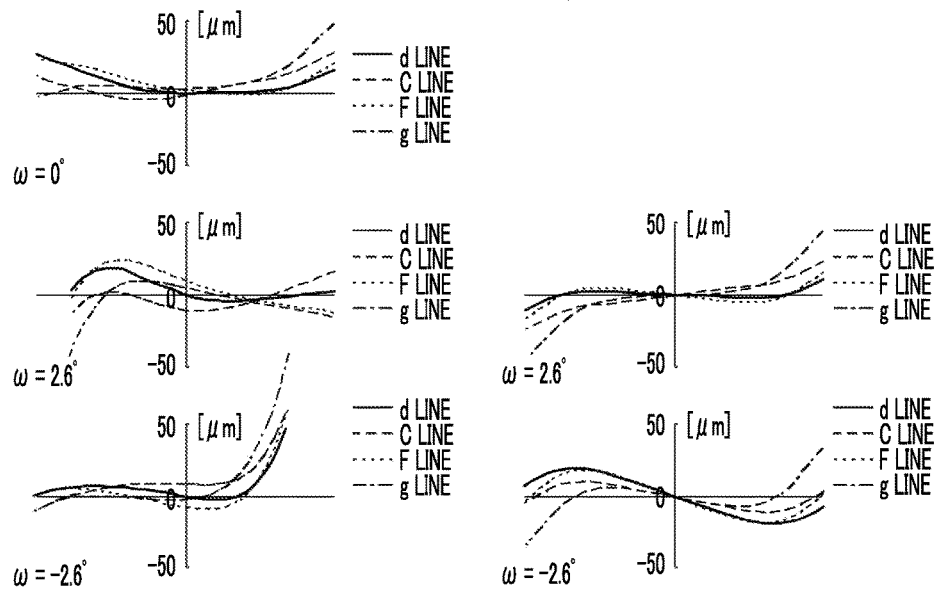

FIG. 26
EXAMPLE 5
*INF DURING MOVEMENT OF VIBRATION-PROOF LENS GROUP EQUIVALENT TO ANGLE OF 0.3
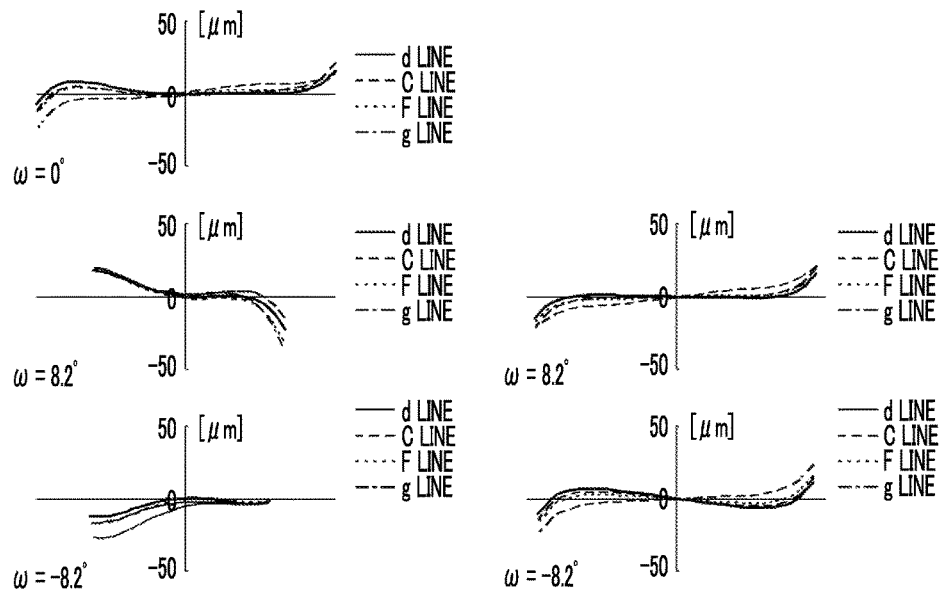
$\beta = -1.0$ DURING MOVEMENT OF VIBRATION-PROOF LENS GROUP EQUIVALENT TO ANGLE OF 0.3
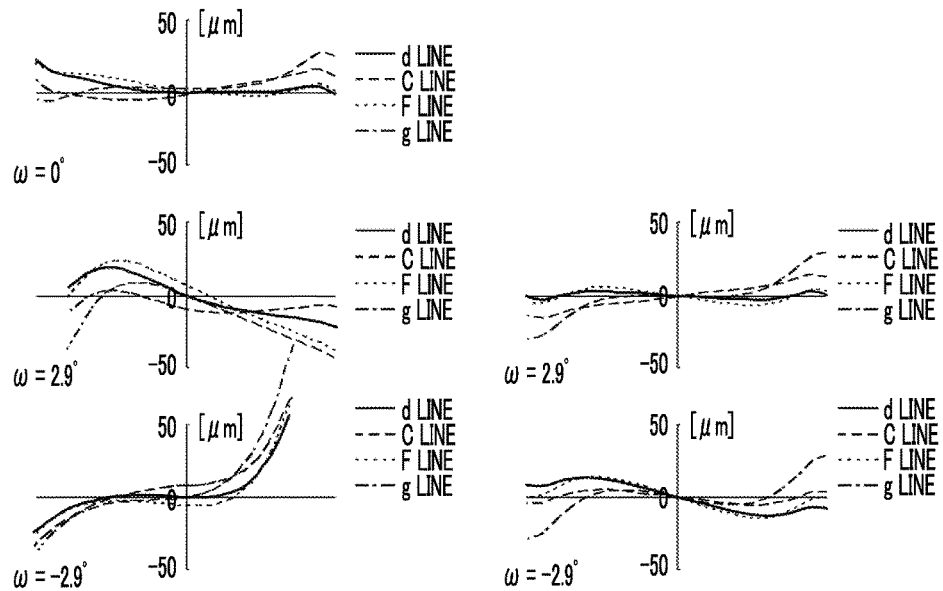

EXAMPLE 6

FIG. 28
EXAMPLE 6
*INF DURING MOVEMENT OF VIBRATION-PROOF LENS GROUP EQUIVALENT TO ANGLE OF 0.3
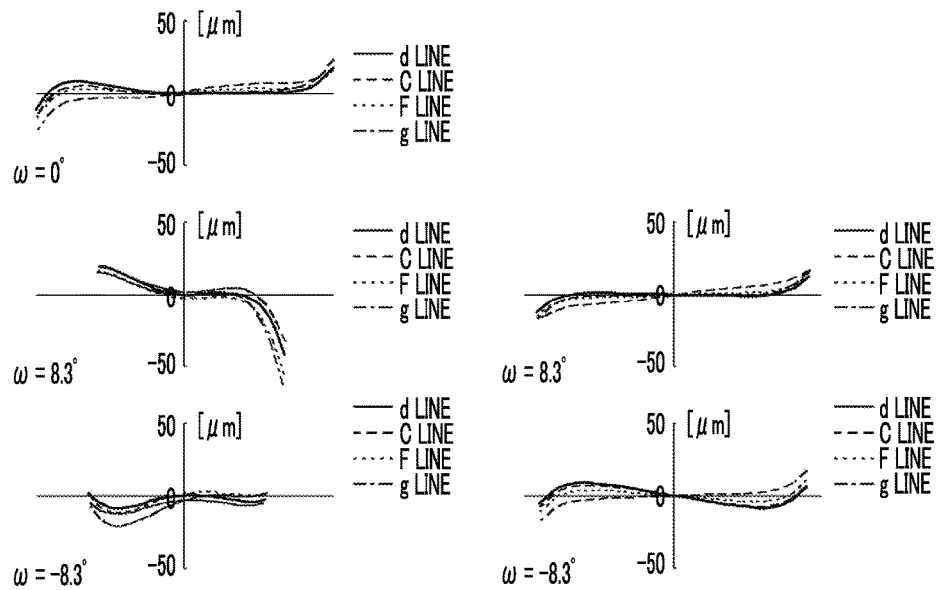
β=-1.0 DURING MOVEMENT OF VIBRATION-PROOF LENS GROUP EQUIVALENT TO ANGLE OF 0.3
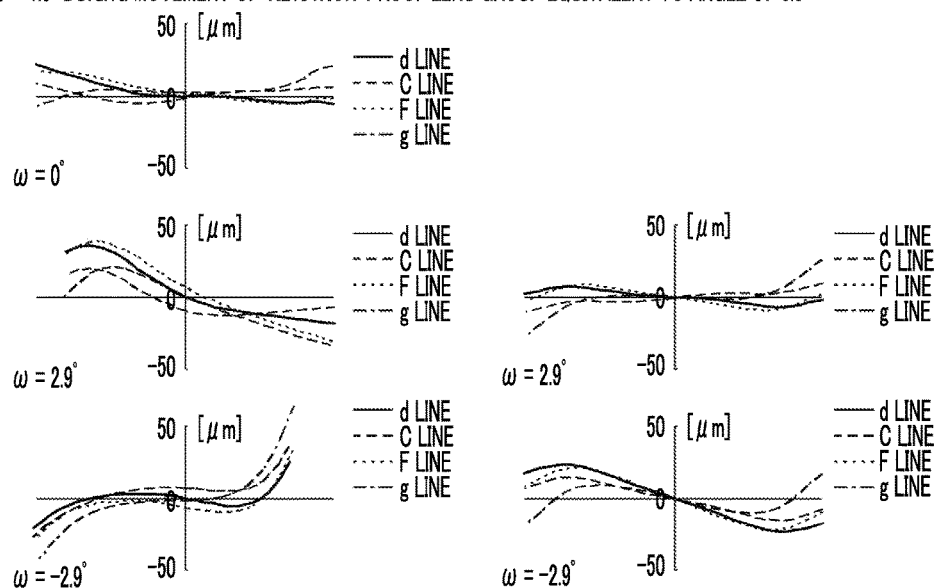

EXAMPLE 7

FIG. 30
EXAMPLE 7
*INF DURING MOVEMENT OF VIBRATION-PROOF LENS GROUP EQUIVALENT TO ANGLE OF 0.3
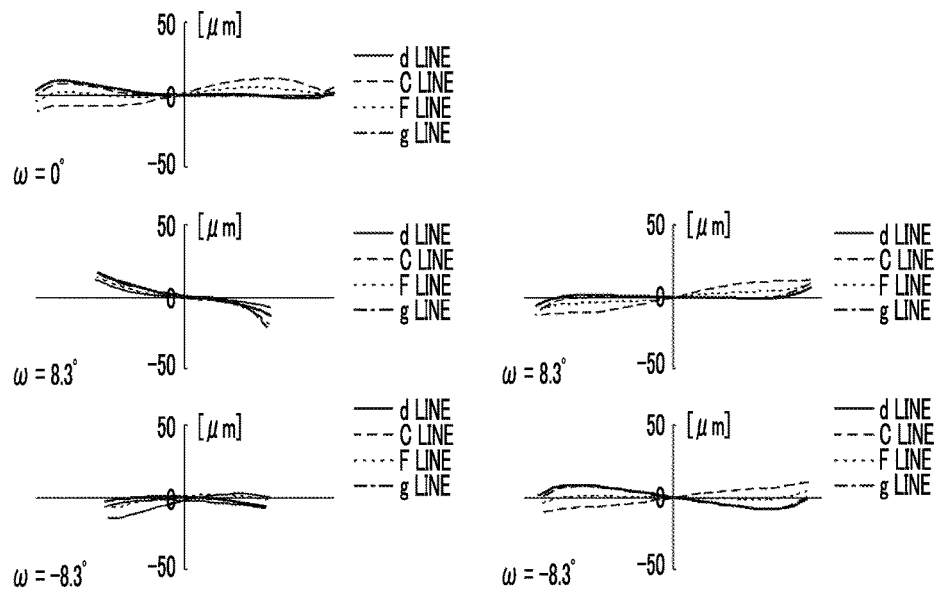
$\beta=-1.0$ DURING MOVEMENT OF VIBRATION-PROOF LENS GROUP EQUIVALENT TO ANGLE OF 0.3
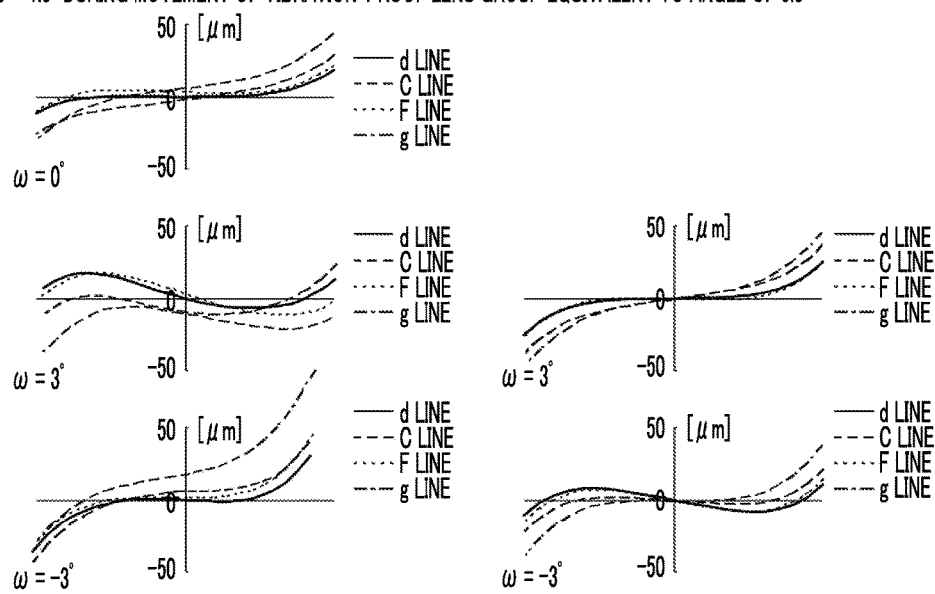

FIG. 31
EXAMPLE 8
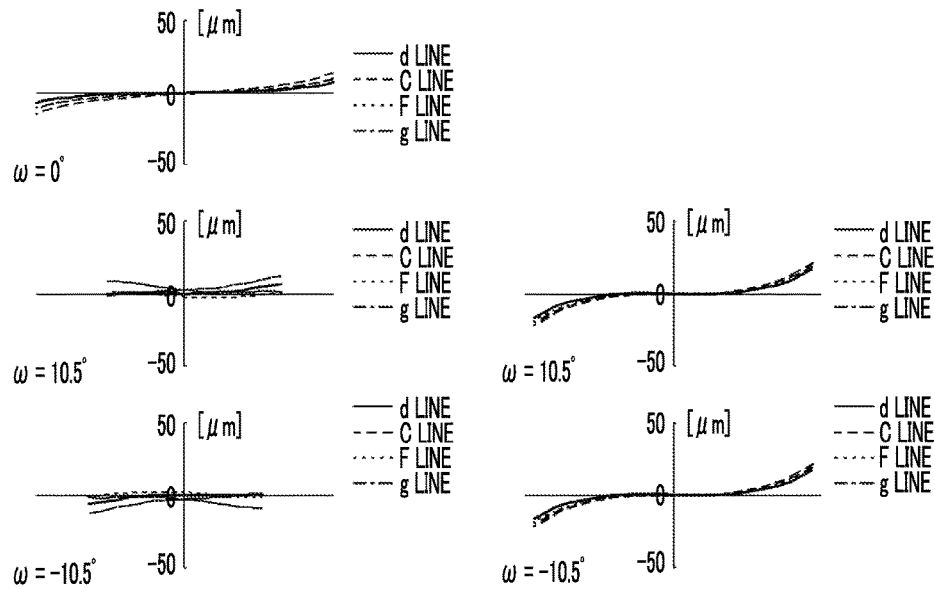
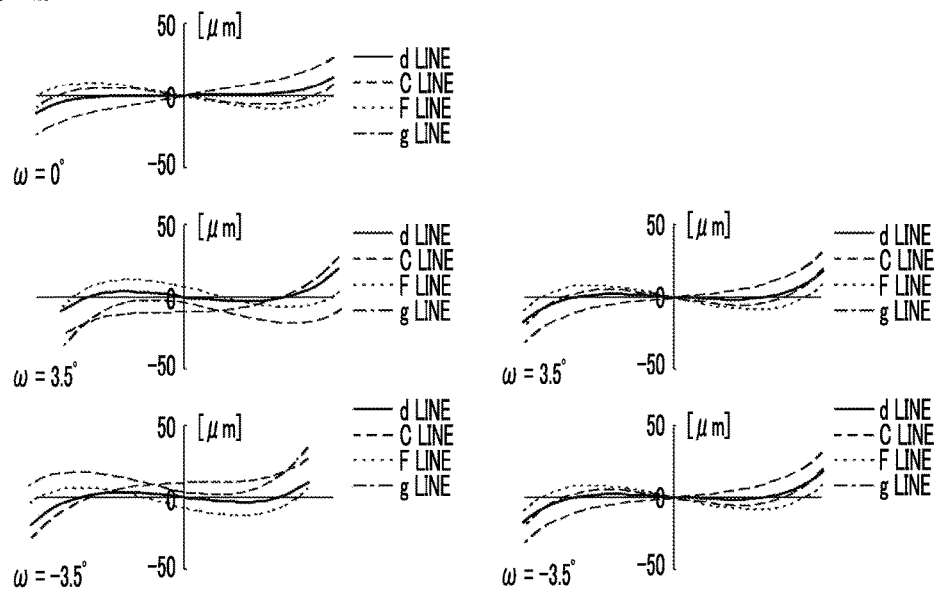

FIG. 32
EXAMPLE 8
*INF DURING MOVEMENT OF VIBRATION-PROOF LENS GROUP EQUIVALENT TO ANGLE OF 0.3
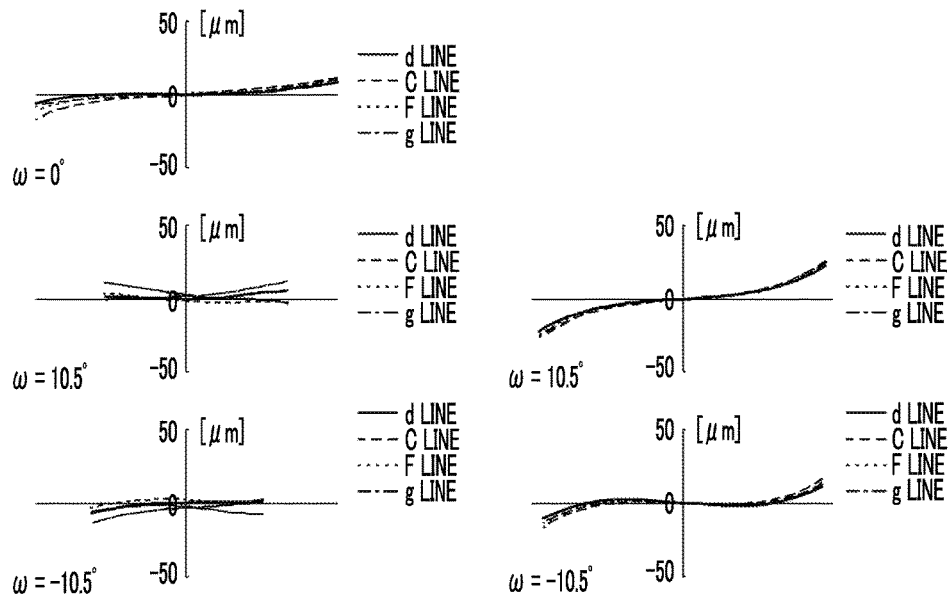
$\beta$ =-1.0 DURING MOVEMENT OF VIBRATION-PROOF LENS GROUP EQUIVALENT TO ANGLE OF 0.3
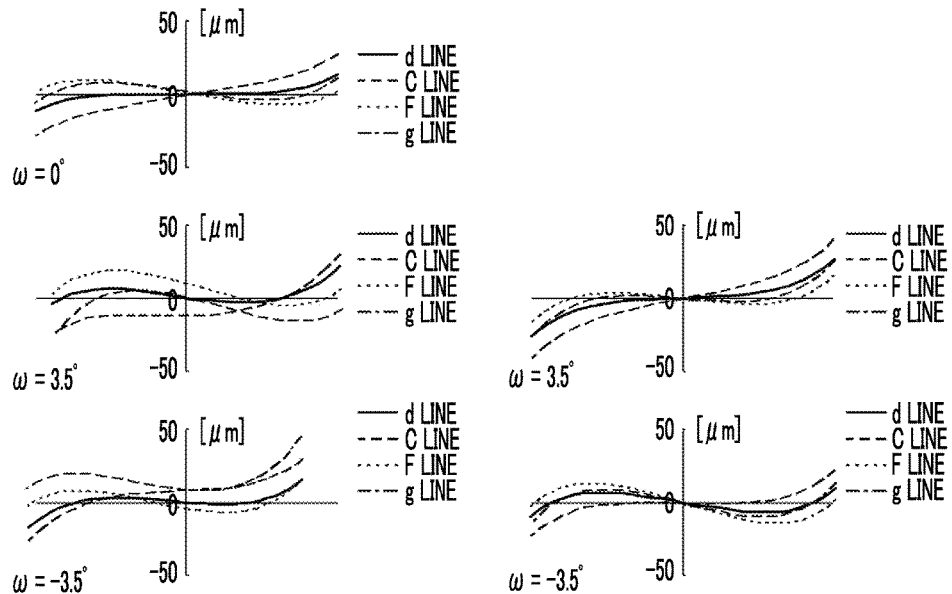

IMAGING LENS AND IMAGING APPARATUS

CROSS REFERENCE TO RELATED APPLICATIONS

The present application claims priority under 35 U.S.C. § 119 to Japanese Patent Application No. 2017-036188 filed on Feb. 28, 2017. The above application is hereby expressly incorporated by reference, in its entirety, into the present application.

BACKGROUND OF THE INVENTION

1. Field of the Invention

The present invention relates to an imaging lens suitable for electronic cameras such as a motion-picture camera, a broadcast camera, a digital camera, a video camera, or a surveillance camera, and an imaging apparatus including this imaging lens.

2. Description of the Related Art

In electronic cameras such as a motion-picture camera, a broadcast camera, a digital camera, a video camera, and a surveillance camera, some of imaging lenses that mainly capture an image of a short-distance object may be called a macro lens.

It is preferable that this macro lens is configured to be able to capture an image at a wide range of object distance from an infinite object of which the imaging magnification is set to a zero magnification to a short-distance object of which the imaging magnification is set to be around an equal magnification. In addition, it is preferable to include a vibration-proof mechanism that corrects blurring of an image on an image plane by moving some lens groups of a lens system in a direction perpendicular to an optical axis. As such a macro lens, for example, an imaging lens of JP2001-272601A is proposed.

SUMMARY OF THE INVENTION

The imaging lens of JP2001-272601A is a medium telephoto macro lens of which the imaging magnification can be set to an equal magnification, and performs vibration proof in some lenses within a fourth lens group. However, since vibration-proof sensitivity becomes smaller and the amount of movement of a vibration-proof lens group becomes larger, an attempt to make sufficient vibration-proof performance held causes a problem of an increase in a lens barrel.

The present invention has been contrived in view of such circumstances, and an object thereof is to provide an imaging lens which is small in size, satisfactorily corrects various aberrations from focusing of an infinite object to focusing of a closest object of which the imaging magnification is set to be around an equal magnification, and has high vibration-proof performance in the entire imaging region, and an imaging apparatus including this imaging lens.

According to the present invention, there is provided an imaging lens comprising, in order from an object side: a first lens group having a positive refractive power; a second lens group having a negative refractive power; a third lens group having a positive refractive power; and a fourth lens group having a negative refractive power, wherein during focusing from an infinite object to a closest object, the first lens group remains stationary with respect to an image plane, the second lens group moves to an image side, the third lens group moves to the object side, and the fourth lens group remains stationary with respect to the image plane, the fourth lens group consists of a fourth-a lens group and a fourth-b lens group in order from the object side, and corrects blurring of an image on the image plane by moving the fourth-a lens group in a direction perpendicular to an optical axis, and in a case where a focal length of the fourth-a lens group is set to f4a, and a focal length of the whole system during focusing of the infinite object is set to f, the following Conditional Expression (1) is satisfied.

$$0.25 < |f4a/f| < 0.45 \quad (1)$$

Meanwhile, it is preferable to satisfy the following Conditional Expression (1-1).

$$0.29 < |f4a/f| < 0.42 \quad (1-1)$$

In the imaging lens of the present invention, it is preferable that the fourth-a lens group includes a cemented lens which is formed by cementing a positive lens and a negative lens together in this order from the object side, and in a case where an Abbe number of the negative lens constituting the cemented lens of the fourth-a lens group in a d line is set to ν4ab, and an Abbe number of the positive lens constituting the cemented lens of the fourth-a lens group in a d line is set to ν4aa, it is preferable to satisfy the following Conditional Expression (2), and more preferable to satisfy the following Conditional Expression (2-1).

$$18 < \nu 4ab - \nu 4aa < 35 \quad (2)$$

$$27 < \nu 4ab - \nu 4aa < 35 \quad (2-1)$$

In addition, it is preferable that, in order from the object side, the first lens group consists of a first-a lens having a positive refractive power, a first-b lens having a positive refractive power, a first-c lens having a negative refractive power, and a first-d lens having a positive refractive power, and in a case where an Abbe number of the first-b lens in a d line is set to ν1b, and an Abbe number of the first-c lens in a d line is set to ν1c, it is preferable to satisfy the following Conditional Expression (3).

$$35 < \nu 1b - \nu 1c < 50 \quad (3)$$

In addition, in a case where a focal length of the first lens group is set to f1, and a focal length of the whole system during focusing of the infinite object is set to f, it is preferable to satisfy the following Conditional Expression (4), and more preferable to satisfy the following Conditional Expression (4-1).

$$0.5 < f1/f < 0.7 \quad (4)$$

$$0.55 < f1/f < 0.67 \quad (4-1)$$

In addition, in a case where a focal length of the second lens group is set to f2, and a focal length of the whole system during focusing of the infinite object is set to f, it is preferable to satisfy the following Conditional Expression (5), and more preferable to satisfy the following Conditional Expression (5-1).

$$0.35 < |f2/f| < 0.6 \quad (5)$$

$$0.38 < |f2/f| < 0.57 \quad (5-1)$$

In addition, in a case where a focal length of the third lens group is set to f3, and a focal length of the whole system during focusing of the infinite object is set to f, it is preferable to satisfy the following Conditional Expression (6), and more preferable to satisfy the following Conditional Expression (6-1).

$$0.4 < f3/f < 0.5 \quad (6)$$

$$0.42 < f3/f < 0.5 \quad (6\text{-}1)$$

In addition, in a case where a focal length of the fourth lens group is set to f4, and a focal length of the whole system during focusing of the infinite object is set to f, it is preferable to satisfy the following Conditional Expression (7), and more preferable to satisfy the following Conditional Expression (7-1).

$$0.5 < |f4/f| < 2 \quad (7)$$

$$0.6 < |f4/f| < 1.5 \quad (7\text{-}1)$$

In addition, in a case where a lateral magnification of the fourth-a lens group during focusing of the infinite object is set to β4a, and a lateral magnification of the fourth-b lens group during focusing of the infinite object is set to β4b, it is preferable to satisfy the following Conditional Expression (8), and more preferable to satisfy the following Conditional Expression (8-1).

$$1 < |(1-\beta 4a) \times \beta 4b| < 2 \quad (8)$$

$$1.3 < |(1-\beta 4a) \times \beta 4b| < 1.6 \quad (8\text{-}1)$$

In addition, it is preferable that, in order from the object side, the fourth-a lens group consists of a cemented lens which is formed by cementing a fourth-aa lens having a positive refractive power and a fourth-ab lens having a negative refractive power together in this order from the object side, and a fourth-ac lens having a negative refractive power.

In this case, in a case where an Abbe number of the fourth-ac lens in a d line is set to v4ac, it is preferable to satisfy the following Conditional Expression (9), and more preferable to satisfy the following Conditional Expression (9-1).

$$60 < v4ac < 100 \quad (9)$$

$$70 < v4ac < 100 \quad (9\text{-}1)$$

According to the present invention, there is provided an imaging apparatus comprising the imaging lens of the present invention.

Meanwhile, the term "consist of ~" is intended to be allowed to include a lens having substantially no power, optical elements, other than a lens, such as a stop, a mask, cover glass, or a filter, mechanism portions such as a lens flange, a lens barrel, an imaging device, or a camera-shake correction mechanism, and the like, in addition to the things enumerated as components.

In addition, the term "lens group" is not necessarily composed of a plurality of lenses, and may be composed of only one lens. In addition, the sign of the refractive power of the lens group, the sign of the refractive power of the lens, and the surface shape of the lens are assumed to be those in a paraxial region in a case where an aspherical surface is included. In addition, the sign of the curvature radius is set to be positive in a case where a surface shape is convex on the object side, and is set to be negative in a case where a surface shape is convex on the image side.

According to the present invention, an imaging lens consists of, in order from an object side: a first lens group having a positive refractive power; a second lens group having a negative refractive power; a third lens group having a positive refractive power; and a fourth lens group having a negative refractive power, wherein during focusing from an infinite object to a closest object, the first lens group remains stationary with respect to an image plane, the second lens group moves to an image side, the third lens group moves to the object side, and the fourth lens group remains stationary with respect to the image plane, the fourth lens group consists of a fourth-a lens group and a fourth-b lens group in order from the object side, and corrects blurring of an image on the image plane by moving the fourth-a lens group in a direction perpendicular to an optical axis, and in a case where a focal length of the fourth-a lens group is set to f4a, and a focal length of the whole system during focusing of the infinite object is set to f, the following Conditional Expression (1) is satisfied. Therefore, it is possible to provide an imaging lens which is small in size, satisfactorily corrects various aberrations from focusing of an infinite object to focusing of a closest object of which the imaging magnification is set to be around an equal magnification, and has high vibration-proof performance in the entire imaging region, and an imaging apparatus including this imaging lens.

BRIEF DESCRIPTION OF THE DRAWINGS

FIG. 1 is a cross-sectional view illustrating a lens configuration of an imaging lens (in common with that of Example 1) according to an embodiment of the present invention.

FIG. 2 is a cross-sectional view illustrating a lens configuration of an imaging lens of Example 2 of the present invention.

FIG. 3 is a cross-sectional view illustrating a lens configuration of an imaging lens of Example 3 of the present invention.

FIG. 4 is a cross-sectional view illustrating a lens configuration of an imaging lens of Example 4 of the present invention.

FIG. 5 is a cross-sectional view illustrating a lens configuration of an imaging lens of Example 5 of the present invention.

FIG. 6 is a cross-sectional view illustrating a lens configuration of an imaging lens of Example 6 of the present invention.

FIG. 18 is a diagram of lateral aberrations (during vibration proof) of the imaging lens of Example 1 of the present invention.

FIG. 20 is a diagram of lateral aberrations (during vibration proof) of the imaging lens of Example 2 of the present invention.

FIG. 22 is a diagram of lateral aberrations (during vibration proof) of the imaging lens of Example 3 of the present invention.

FIG. 24 is a diagram of lateral aberrations (during vibration proof) of the imaging lens of Example 4 of the present invention.

FIG. 26 is a diagram of lateral aberrations (during vibration proof) of the imaging lens of Example 5 of the present invention.

FIG. 28 is a diagram of lateral aberrations (during vibration proof) of the imaging lens of Example 6 of the present invention.

FIG. 30 is a diagram of lateral aberrations (during vibration proof) of the imaging lens of Example 7 of the present invention.

FIG. 31 is a diagram of lateral aberrations of the imaging lens of Example 8 of the present invention.

FIG. 32 is a diagram of lateral aberrations (during vibration proof) of the imaging lens of Example 8 of the present invention.

DESCRIPTION OF THE PREFERRED EMBODIMENTS

Figure 7:
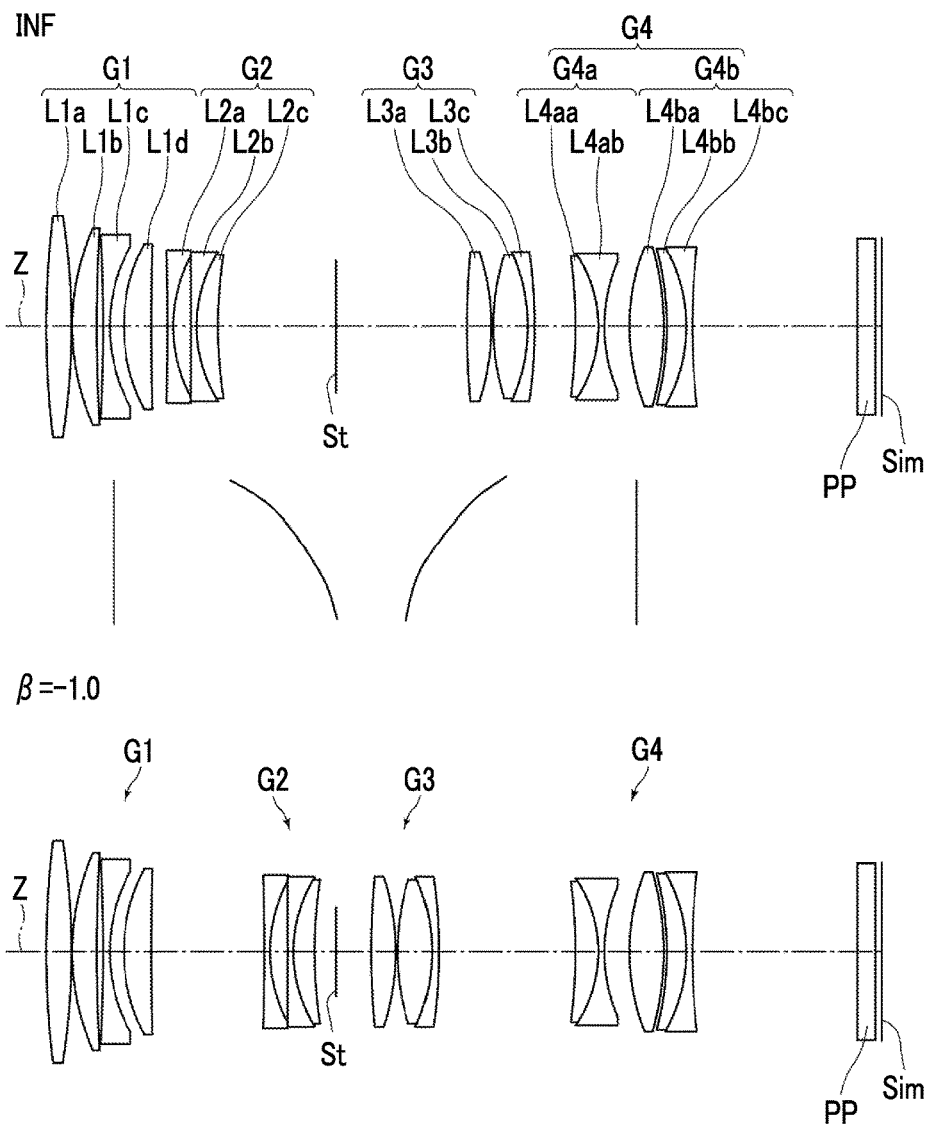
FIG. 7 is a cross-sectional view illustrating a lens configuration of an imaging lens of Example 7 of the present invention.

Hereinafter, an embodiment of the present invention will be described in detail with reference to the accompanying drawings. FIG. 1 is a cross-sectional view illustrating a lens configuration of an imaging lens according to an embodiment of the present invention. In the drawing, a configuration during focusing of an infinite object is shown on the upper portion to which "INF" is attached, and a configuration during focusing of a closest object of which the imaging magnification is set to an equal magnification is shown on the lower portion to which "β=−1.0" is attached. The configuration example shown in FIG. 1 is in common with the configuration of an imaging lens of Example 1 described later. In FIG. 1, the left side is an object side, the right side is an image side, and an aperture stop St shown in the drawing does not necessarily indicate its size and/or shape, but indicates the position of a stop on an optical axis Z.

The imaging lens of the present embodiment is composed of, in order from the object side, a first lens group G1 having a positive refractive power, a second lens group G2 having a negative refractive power, a third lens group G3 having a positive refractive power, and a fourth lens group G4 having a negative refractive power.

In a case where this imaging lens is applied to an imaging apparatus, it is preferable that cover glass, a prism, and/or various types of filters such as an infrared cut filter or a low-pass filter are disposed between an optical system and an image plane Sim, in accordance with the configuration of a camera side having a lens mounted thereon, and thus FIG. 1 shows an example in which a parallel plate-like optical member PP oriented to these components is disposed between a lens system and the image plane Sim.

This imaging lens is configured such that, during focusing from the infinite object to the closest object, the first lens group G1 remains stationary with respect to an image plane Sim, the second lens group G2 moves to the image side, the third lens group G3 moves to the object side, and the fourth lens group G4 remains stationary with respect to the image plane Sim.

In this manner, the entire length becomes constant during focusing by fixing the first lens group G1 during focusing, and thus it is possible to reduce a concern of interfering with a subject during imaging. In addition, it is possible to prevent dust from intruding into a lens barrel by fixing the fourth lens group G4 during focusing. In addition, as a floating focus type, two groups of the second lens group G2 and the third lens group G3 are independently moved along different trajectories during focusing, and thus it is possible to suppress aberration fluctuation in an imaging range from the infinite object to the closest object, and to obtain high optical performance. Meanwhile, the second lens group G2 and the third lens group G3 may be linearly moved, and may be curvilinearly moved.

The fourth lens group G4 is configured to consist of a fourth-a lens group G4a and a fourth-b lens group G4b in order from the object side, and to correct blurring of an image on the image plane by moving the fourth-a lens group G4a in a direction perpendicular to the optical axis.

In this manner, it is possible to obtain satisfactory vibration-proof performance by performing vibration proof in the fourth lens group G4 remaining stationary during focusing. In addition, it is possible to reduce the weight of a movement group by moving only a portion of the fourth lens group G4.

In addition, in a case where the focal length of the fourth-a lens group is set to f4a and the focal length of the whole system during focusing of the infinite object is set to f, it is configured to satisfy Conditional Expression (1). The ratio value is not set to be equal to or greater than the upper limit of Conditional Expression (1). Thereby, since the power of a vibration-proof lens group can be prevented from becoming excessively weak, it is possible to suppress the amount of movement during vibration proof. The ratio value is not set to be equal to or less than the lower limit of Conditional Expression (1). Thereby, since a change in performance during vibration proof can be prevented from increasing excessively, it is possible to obtain satisfactory vibration-proof performance. Meanwhile, in a case where the following Conditional Expression (1-1) is satisfied, it is possible to make characteristics more satisfactory.

$$0.25 < |f4a/f| < 0.45 \tag{1}$$

$$0.29 < |f4a/f| < 0.42 \tag{1-1}$$

In the imaging lens of the present embodiment, it is preferable that the fourth-a lens group G4a includes a cemented lens which is formed by cementing a positive lens and a negative lens together in this order from the object side, and that Conditional Expression (2) is satisfied in a case where the Abbe number of the negative lens in a d line constituting the cemented lens of the fourth-a lens group is set to v4ab and the Abbe number of the positive lens in the d line constituting the cemented lens of the fourth-a lens group is set to v4aa. In this manner, the cemented lens consisting of a positive lens and a negative lens is included in the fourth-a lens group G4a which is a vibration-proof lens group, which leads to the advantage of the correction of spherical aberration, whereby it is possible to further suppress a fluctuation in chromatic aberration during vibration proof. In addition, it is possible to suppress the generation of the chromatic aberration during vibration proof by satisfying Conditional Expression (2). Meanwhile, in a case where the following Conditional Expression (2-1) is satisfied, it is possible to make characteristics more satisfactory.

$$18 < v4ab - v4aa < 35 \quad (2)$$

$$27 < v4ab - v4aa < 35 \quad (2\text{-}1)$$

In addition, it is preferable that, in order from the object side, the first lens group G1 consists of a first-a lens L1a having a positive refractive power, a first-b lens L1b having a positive refractive power, a first-c lens L1c having a negative refractive power, and a first-d lens L1d having a positive refractive power, and that, in a case where the Abbe number of the first-b lens in the d line is set to v1b and the Abbe number of the first-c lens in the d line is set to v1c, Conditional Expression (3) is satisfied. In this manner, the first lens group G1 is composed of a plurality of lenses, and thus it is possible to disperse assembly sensitivity. In addition, on-axis chromatic aberration during focusing of the infinite object can be maintained satisfactorily by satisfying Conditional Expression (3).

$$35 < v1b - v1c < 50 \quad (3)$$

In addition, in a case where the focal length of the first lens group is set to f1 and the focal length of the whole system during focusing of the infinite object is set to f, it is preferable to satisfy Conditional Expression (4). The ratio value is not set to be equal to or greater than the upper limit of Conditional Expression (4), which leads to the advantage of a reduction in size. The ratio value is not set to be equal to or less than the lower limit of Conditional Expression (4), and thus it is possible to suppress a fluctuation in the spherical aberration and the chromatic aberration. Meanwhile, in a case where the following Conditional Expression (4-1) is satisfied, it is possible to make characteristics more satisfactory.

$$0.5 < f1/f < 0.7 \quad (4)$$

$$0.55 < f1/f < 0.67 \quad (4\text{-}1)$$

In addition, in a case where the focal length of the second lens group is set to f2 and the focal length of the whole system during focusing of the infinite object is set to f, it is preferable to satisfy Conditional Expression (5). The ratio value is not set to be equal to or greater than the upper limit of Conditional Expression (5), and thus the amount of movement during focusing is suppressed, which leads to the advantage of a reduction in size. The ratio value is not set to be equal to or less than the lower limit of Conditional Expression (5), and thus it is possible to suppress an aberration fluctuation during focusing. Meanwhile, in a case where the following Conditional Expression (5-1) is satisfied, it is possible to make characteristics more satisfactory.

$$0.35 < |f2/f| < 0.6 \quad (5)$$

$$0.38 < |f2/f| < \mathbf{0.57} \quad (5\text{-}1)$$

In addition, in a case where the focal length of the third lens group is set to f3 and the focal length of the whole system during focusing of the infinite object is set to f, it is preferable to satisfy Conditional Expression (6). The ratio value is not set to be equal to or greater than the upper limit of Conditional Expression (6), and thus the amount of movement during focusing is suppressed, which leads to the advantage of a reduction in size. The ratio value is not set to be equal to or less than the lower limit of Conditional Expression (6), and thus it is possible to suppress an aberration fluctuation during focusing. Meanwhile, in a case where the following Conditional Expression (6-1) is satisfied, it is possible to make characteristics more satisfactory.

$$0.4 < f3/f < 0.5 \quad (6)$$

$$0.42 < f3/f < 0.5 \quad (6\text{-}1)$$

In addition, in a case where the focal length of the fourth lens group is set to f4 and the focal length of the whole system during focusing of the infinite object is set to f, it is preferable to satisfy Conditional Expression (7). The ratio value is not set to be equal to or greater than the upper limit of Conditional Expression (7), which leads to the advantage of a reduction in size. The ratio value is not set to be equal to or less than the lower limit of Conditional Expression (7). Thereby, a back focus is easily secured, and thus it is possible to insert an attachment (such as a tele-converter) or the like, as necessary, after the lens system. Meanwhile, in a case where the following Conditional Expression (7-1) is satisfied, it is possible to make characteristics more satisfactory.

$$0.5 < |f4/f| < 2 \quad (7)$$

$$0.6 < |f4/f| < 1.5 \quad (7\text{-}1)$$

In addition, in a case where the lateral magnification of the fourth-a lens group during focusing of the infinite object is set to β4a and the lateral magnification of the fourth-b lens group during focusing of the infinite object is set to β4b, it is preferable to satisfy Conditional Expression (8). The ratio value is not set to be equal to or greater than the upper limit of Conditional Expression (8). Thereby, since the sensitivity of the vibration-proof lens group can be prevented from increasing excessively, it is possible to suppress a fluctuation in coma aberration, chromatic aberration and the like during vibration proof. The ratio value is not set to be equal to or less than the lower limit of Conditional Expression (8), and thus since the amount of movement during vibration proof can be prevented from increasing excessively, which leads to the advantage of a reduction in the diameter of a lens barrel. Meanwhile, in a case where the following Conditional Expression (8-1) is satisfied, it is possible to make characteristics more satisfactory.

$$1 < |(1-\beta 4a) \times \beta 4b| < 2 \quad (8)$$

$$1.3 < |(1-\beta 4a) \times \beta 4b| < 1.6 \quad (8\text{-}1)$$

In addition, it is preferable that, in order from the object side, the fourth-a lens group G4a consists of a cemented lens formed by cementing a fourth-aa lens L4aa having a positive refractive power and a fourth-ab lens L4ab having a negative refractive power together in this order from the object side, and a fourth-ac lens L4ac having a negative refractive power. In this manner, the fourth-a lens group G4a which is a vibration-proof lens group is composed of three lenses, and thus it is possible to reduce a change in performance during vibration proof.

In this case, in a case where the Abbe number of the fourth-ac lens in the d line is set to v4ac, it is preferable to satisfy Conditional Expression (9). It is possible to more effectively suppress the generation of chromatic aberration during vibration proof by satisfying Conditional Expression (9). Meanwhile, in a case where the following Conditional Expression (9-1) is satisfied, it is possible to make characteristics more satisfactory.

$$60<v4ac<100 \quad (9)$$

$$70<v4ac<100 \quad (9\text{-}1)$$

In a case where the imaging lens is used in a strict environment, it is preferable that protective multilayer film coating is performed. Further, antireflection coating for reducing ghost light in use or the like may be performed with the exception of protective coating.

In addition, in a case where this imaging lens is applied to an imaging apparatus, cover glass, a prism, and/or various types of filters such as an infrared cut filter or a low-pass filter may be disposed between the lens system and the image plane Sim, in accordance with the configuration of a camera side having a lens mounted thereon. Meanwhile, instead of disposing various types of filters described above between the lens system and the image plane Sim, various types of filters described above may be disposed between respective lenses, and coating having the same actions as those of various types of filters may be performed on the lens surface of any of the lenses.

Next, numerical value examples of the imaging lens of the present invention will be described.

First, an imaging lens of Example 1 will be described. FIG. 1 shows a cross-sectional view illustrating a configuration of the imaging lens of Example 1. Meanwhile, in FIG. 1 and FIGS. 2 to 8 corresponding to Examples 2 to 8 described later, configurations during focusing of the infinite object are shown on the upper portion to which "INF" is attached, and configurations during focusing of the closest object of which the imaging magnification is set to an equal magnification are shown on the lower portion to which "β=−1.0" is attached. In addition, the left side is an object side, the right side is an image side, and the aperture stop St shown in the drawings does not necessarily indicate its size and/or shape, but indicates the position of a stop on the optical axis Z.

The imaging lens of Example 1 is composed of, in order from the object side, a first lens group G1 having a positive refractive power, a second lens group G2 having a negative refractive power, a third lens group G3 having a positive refractive power, and a fourth lens group G4 having a negative refractive power, the fourth lens group G4 being composed of a fourth-a lens group G4a which is a vibration-proof lens group and a fourth-b lens group G4b in order from the object side. In addition, the imaging lens is configured such that, during focusing from the infinite object to the closest object, the first lens group G1 remains stationary with respect to the image plane Sim, the second lens group G2 moves to the image side, the third lens group G3 moves to the object side, and the fourth lens group G4 remains stationary with respect to the image plane Sim.

The first lens group G1 is composed of four lenses of lenses L1a to L1d, the second lens group G2 is composed of three lenses of lenses L2a to L2c, the third lens group G3 is composed of three lenses of lenses L3a to L3c, the fourth-a lens group G4a is composed of three lenses of lenses L4aa to L4ac, and the fourth-b lens group G4b is composed of three lenses of lenses L4ba to L4bc.

Table 1 shows lens data of the imaging lens of Example 1, Table 2 shows data relating to specifications, Table 3 shows data relating to surface spacings changing during focusing, and Table 4 shows data relating to aspherical coefficients. In the following, the meanings of symbols in the tables will be described by taking an example of those in Example 1, but the same is basically true of Examples 2 to 8.

In the lens data of Table 1, the column of a surface number indicates surface numbers sequentially increases toward the image side with the surface of a component closest to the object side set to a first surface, the column of a curvature radius indicates curvature radii of respective surfaces, and the column of a surface spacing indicates distances on the optical axis Z between the respective surfaces and the next surfaces. In addition, the column of n indicates refractive indexes of respective optical elements with respect to a d line (wavelength of 587.6 nm (nanometer)), and the column of v indicates Abbe numbers of the respective optical elements with respect to the d line (wavelength of 587.6 nm (nanometer)). Here, the sign of the curvature radius is set to be positive in a case where s surface shape is convex on the object side, and is set to be negative in a case where a surface shape is convex on the image side. The lens data indicates the optical member PP together. In addition, in the lens data, DD [surface number] is written in the places of surface spacings having a change in spacing during focusing. Numerical values corresponding to DD [surface number] are shown in Table 3.

The data relating to specifications of Table 2 indicates values of a focal length of the whole system f, an F-Number FNo, and the total angle of view 2ω.

In the lens data of Table 1, mark * is to which attached the surface number of an aspherical surface, and the numerical values of a paraxial curvature radius are indicated as the curvature radius of the aspherical surface. The data relating to the aspherical coefficients of Table 4 indicates surface numbers of the aspherical surfaces and aspherical coefficients relating to these aspherical surfaces. "E±n" (n is an integer) in the numerical values of the aspherical coefficients of Table 4 means "×10$^{±n}$". The aspherical coefficients are values of respective coefficients KA and Am (m=4 to 20) in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial curvature radius, and KA and Am are aspherical coefficients (m=4 to 20).

TABLE 1

Example 1•Lens Data (n and v are based on d line)

| Surface Number | Curvature Radius | Surface Spacing | n | v |
|---|---|---|---|---|
| 1 | 119.8423 | 5.44 | 1.72916 | 54.67 |
| 2 | −119.8423 | 0.80 | | |
| 3 | 59.8966 | 5.67 | 1.49700 | 81.54 |
| 4 | −101.2948 | 0.71 | | |
| 5 | −67.2399 | 1.25 | 1.62588 | 35.70 |
| 6 | 27.2189 | 0.80 | | |
| *7 | 25.2054 | 8.70 | 1.58313 | 59.46 |
| *8 | −75.3450 | DD[8] | | |

TABLE 1-continued

Example 1•Lens Data (n and ν are based on d line)

| Surface Number | Curvature Radius | Surface Spacing | n | ν |
|---|---|---|---|---|
| 9 | −115.0082 | 1.00 | 1.58913 | 61.13 |
| 10 | 21.8873 | 3.20 | | |
| 11 | −168.1721 | 0.96 | 1.67300 | 38.15 |
| 12 | 22.3200 | 3.54 | 2.00069 | 25.46 |
| 13 | 95.1317 | DD[13] | | |
| 14(Stop) | ∞ | DD[14] | | |
| 15 | 75.2429 | 3.52 | 1.43875 | 94.66 |
| 16 | −48.6919 | 0.10 | | |
| 17 | 51.9815 | 4.34 | 1.49700 | 81.54 |
| 18 | −33.6900 | 1.10 | 1.84666 | 23.78 |
| 19 | −60.0019 | DD[19] | | |
| 20 | −94.7357 | 2.57 | 2.00272 | 19.32 |
| 21 | −33.8670 | 0.91 | 1.69700 | 48.52 |
| 22 | 33.8670 | 1.56 | | |
| 23 | 395.2263 | 0.90 | 1.53775 | 74.70 |
| 24 | 31.3496 | 3.60 | | |
| 25 | 37.5229 | 3.41 | 1.95375 | 32.32 |
| 26 | 709.7839 | 0.10 | | |
| 27 | 59.0208 | 4.90 | 1.51680 | 64.20 |
| 28 | −43.1090 | 1.07 | 1.95906 | 17.47 |
| 29 | −528.8086 | 27.42 | | |
| 30 | ∞ | 2.85 | 1.51680 | 64.20 |
| 31 | ∞ | 1.00 | | |

TABLE 2

Example 1•Specification (d Line)

| | INF | β = −1.0 |
|---|---|---|
| f | 78.79 | |
| FNo. | 2.88 | 3.99 |
| 2ω [°] | 20.2 | 5.0 |

TABLE 3

Example 1•Variable Surface Spacing

| | INF | β = −1.0 |
|---|---|---|
| DD[8] | 2.34 | 17.69 |
| DD[13] | 20.39 | 5.04 |
| DD[14] | 19.53 | 3.58 |
| DD[19] | 6.50 | 22.45 |

TABLE 4

Example 1•Aspheric Coefficient

| Surface Number | 7 | 8 |
|---|---|---|
| KA | 1.0000000E+00 | 1.0000000E+00 |
| A4 | −3.4416765E−06 | −5.6320686E−07 |
| A6 | −1.0271248E−08 | −7.1694496E−09 |
| A8 | 7.8474028E−11 | 5.3448304E−11 |
| A10 | −1.3012707E−12 | −8.2554920E−13 |
| A12 | 5.9808897E−15 | 2.0690520E−15 |
| A14 | 1.5649754E−17 | 8.6700401E−18 |
| A16 | −3.3871063E−19 | −2.1215378E−20 |
| A18 | 1.5229577E−21 | −2.8133141E−22 |
| A20 | −2.5292727E−24 | 7.4217077E−25 |

Figure 9:
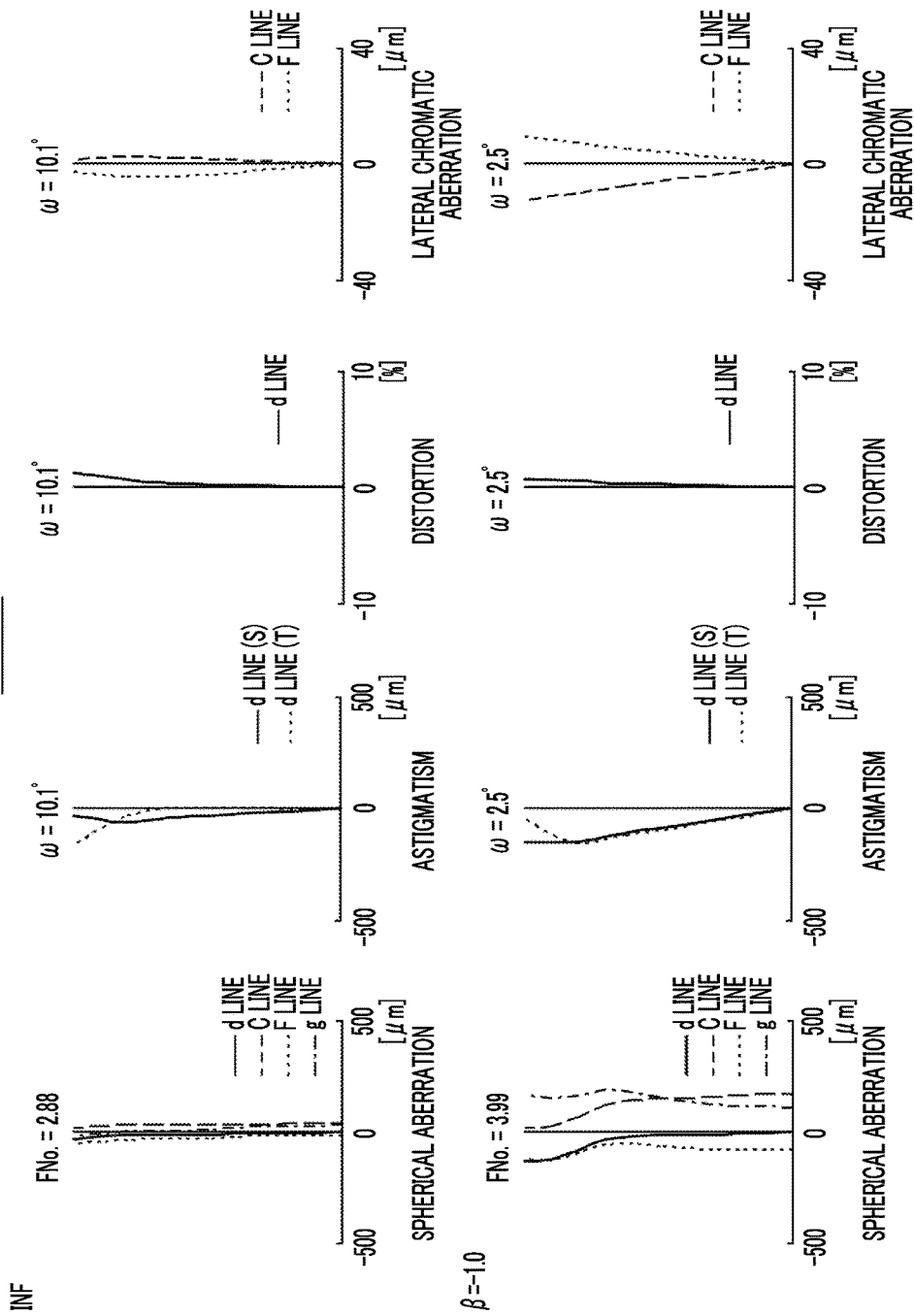
FIG. 9 is a diagram of aberrations of the imaging lens of Example 1 of the present invention.

FIG. 9 shows a diagram of aberrations of the imaging lens of Example 1. Meanwhile, spherical aberration, astigmatism, distortion, and lateral chromatic aberration in a state of being focused on the infinite object are shown in order from the upper left side of FIG. 9, and spherical aberration, astigmatism, distortion, and lateral chromatic aberration in a state of being focused on the closest object of which the imaging magnification is set to an equal magnification are shown in order from the lower left side of FIG. 9. The diagram of aberrations indicating spherical aberration, astigmatism, and distortion shows aberrations in which the d line (wavelength 587.6 nm (nanometer)) is used as a reference wavelength. In the spherical aberration diagram, aberrations relating to the d line (wavelength 587.6 nm (nanometer)), a C line (wavelength 656.3 nm (nanometer)), an F line (wavelength 486.1 nm (nanometer)), and a g line (wavelength 435.8 nm (nanometer)) are shown by a solid line, a long dashed line, a short dashed line, and a dashed-dotted line. In the astigmatism diagram, aberrations in a sagittal direction and a tangential direction are shown by a solid line and a short dashed line, respectively. In the lateral chromatic aberration diagram, aberrations relating to the C line (wavelength 656.3 nm (nanometer)) and the F line (wavelength 486.1 nm (nanometer)) are shown by a long dashed line and a short dashed line, respectively. FNo. in the spherical aberration diagram means an F-Number, and ω in the other aberration diagrams means a half angle of view.

Figure 17:
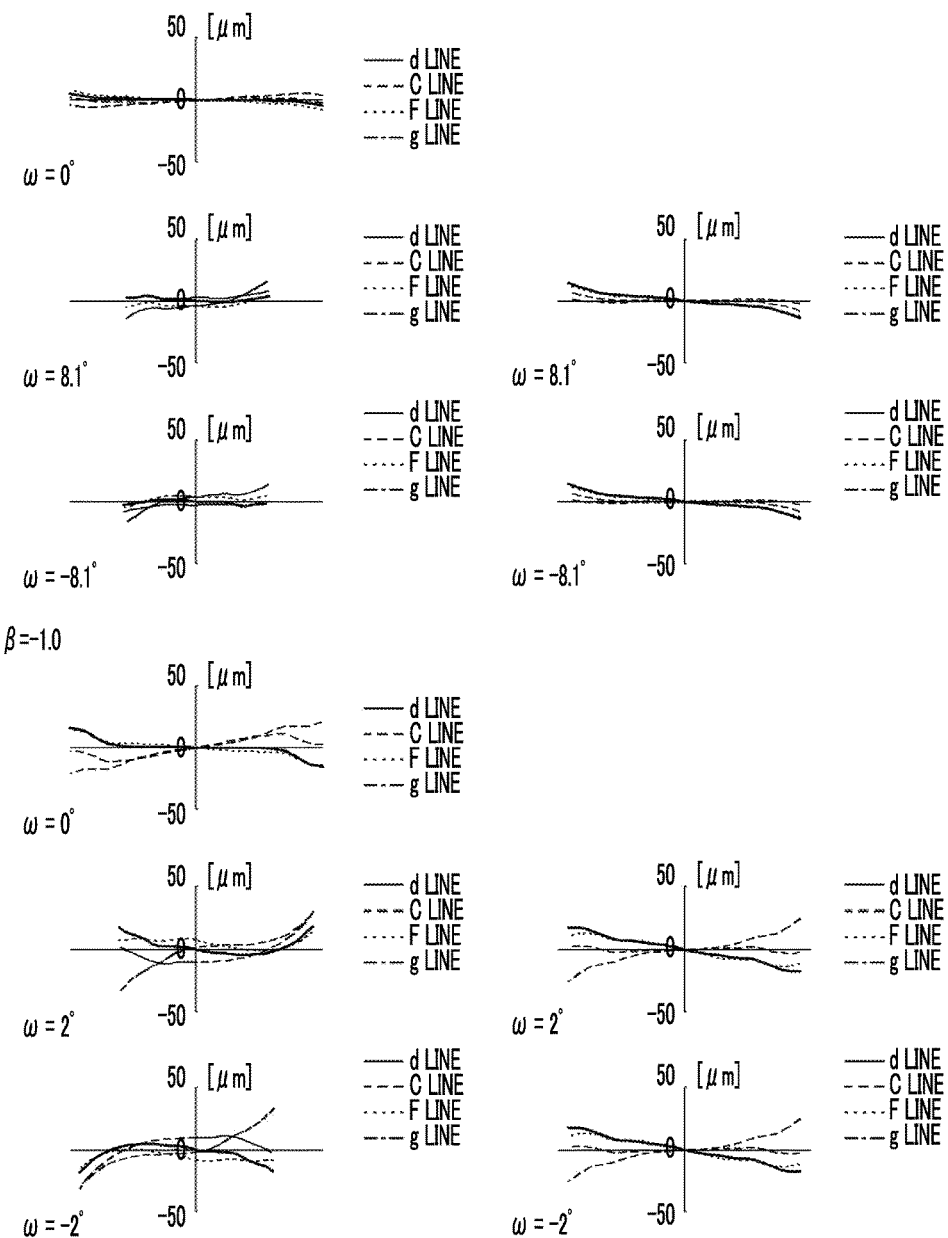
FIG. 17 is a diagram of lateral aberrations of the imaging lens of Example 1 of the present invention.

FIG. 17 shows a diagram of lateral aberrations during the absence of camera-shake correction of the imaging lens of Example 1. In FIG. 17, a lateral aberration diagram during focusing of the infinite object is shown on the upper portion to which "INF" is attached, and a lateral aberration diagram during focusing of the closest object of which the imaging magnification is set to an equal magnification is shown on the lower portion to which "β=−1.0" is attached. The diagram of lateral aberrations shows aberrations in right and left two columns, but the aberrations of the left column are aberrations relating to in a tangential direction, and the aberrations of the right column are aberrations relating to in a sagittal direction. In the diagram of lateral aberrations, aberrations at the center of the image plane are shown on the upper portion, aberrations at a position where an image height is set to 80% of the +side maximum image height are shown on the intermediate portion, and aberrations at a position where an image height is set to 80% of the −side maximum image height are shown on the lower portion.

In addition, FIG. 18 shows a diagram of lateral aberrations during the presence of camera-shake correction (movement of a vibration-proof lens group equivalent to an angle of 0.3) of the imaging lens of Example 1. The description of the drawing is the same as that in a case of the absence of camera-shake correction. Meanwhile, in FIGS. 17 and 18, aberrations relating to the d line (wavelength 587.6 nm (nanometer)), the C line (wavelength 656.3 nm (nanometer)), the F line (wavelength 486.1 nm (nanometer)), and the g line (wavelength 435.8 nm (nanometer)) are shown by a solid line, a long dashed line, a short dashed line, and a dashed-dotted line. In addition, ω in the diagram of aberrations means a half angle of view.

Symbols, meanings, and description methods of the respective pieces of data which have been set forth in the description of Example 1 are the same as those in the following examples unless otherwise noted, and thus the repeated description thereof will be omitted below.

Figure 10:
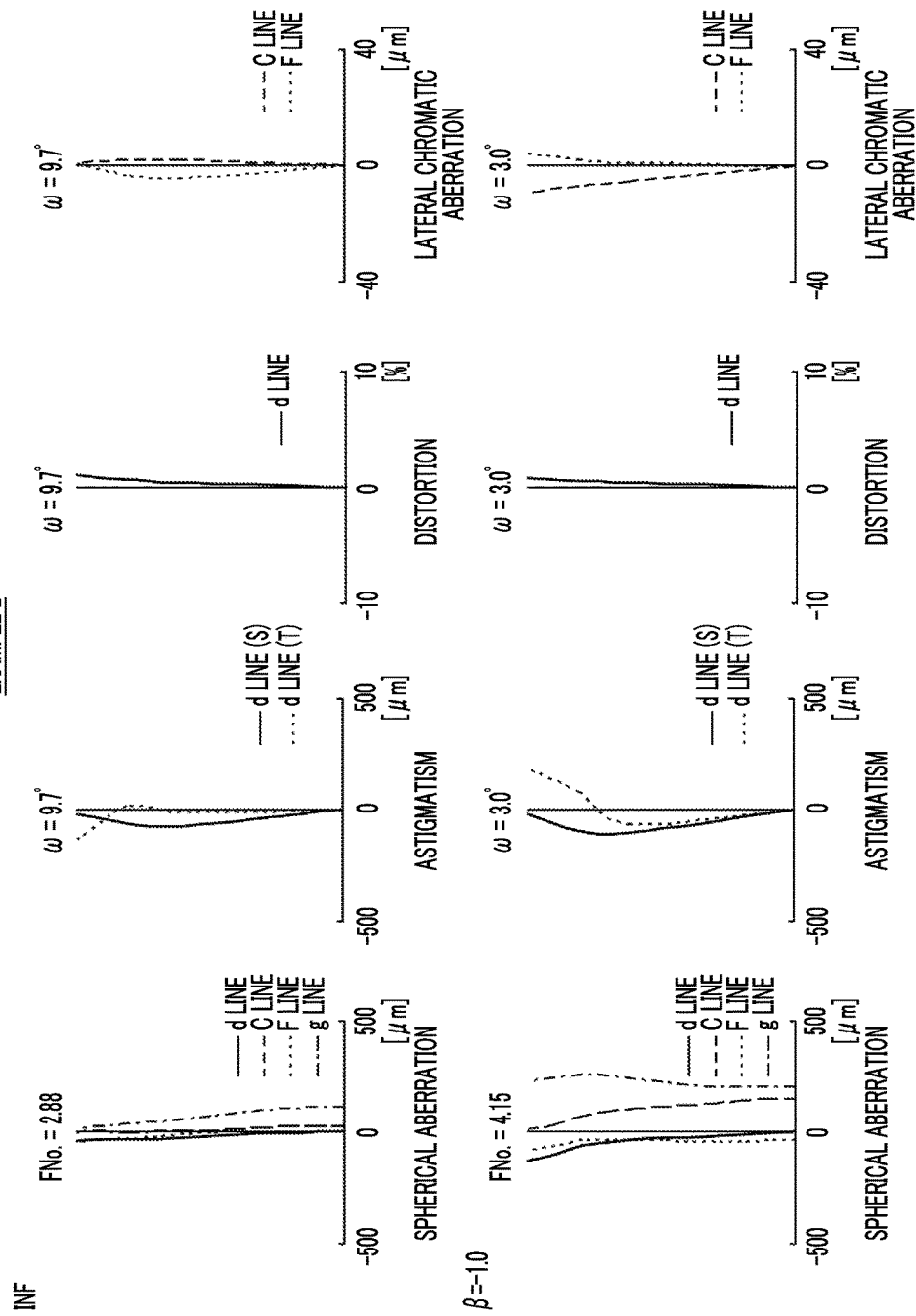
FIG. 10 is a diagram of aberrations of the imaging lens of Example 2 of the present invention.
Figure 19:
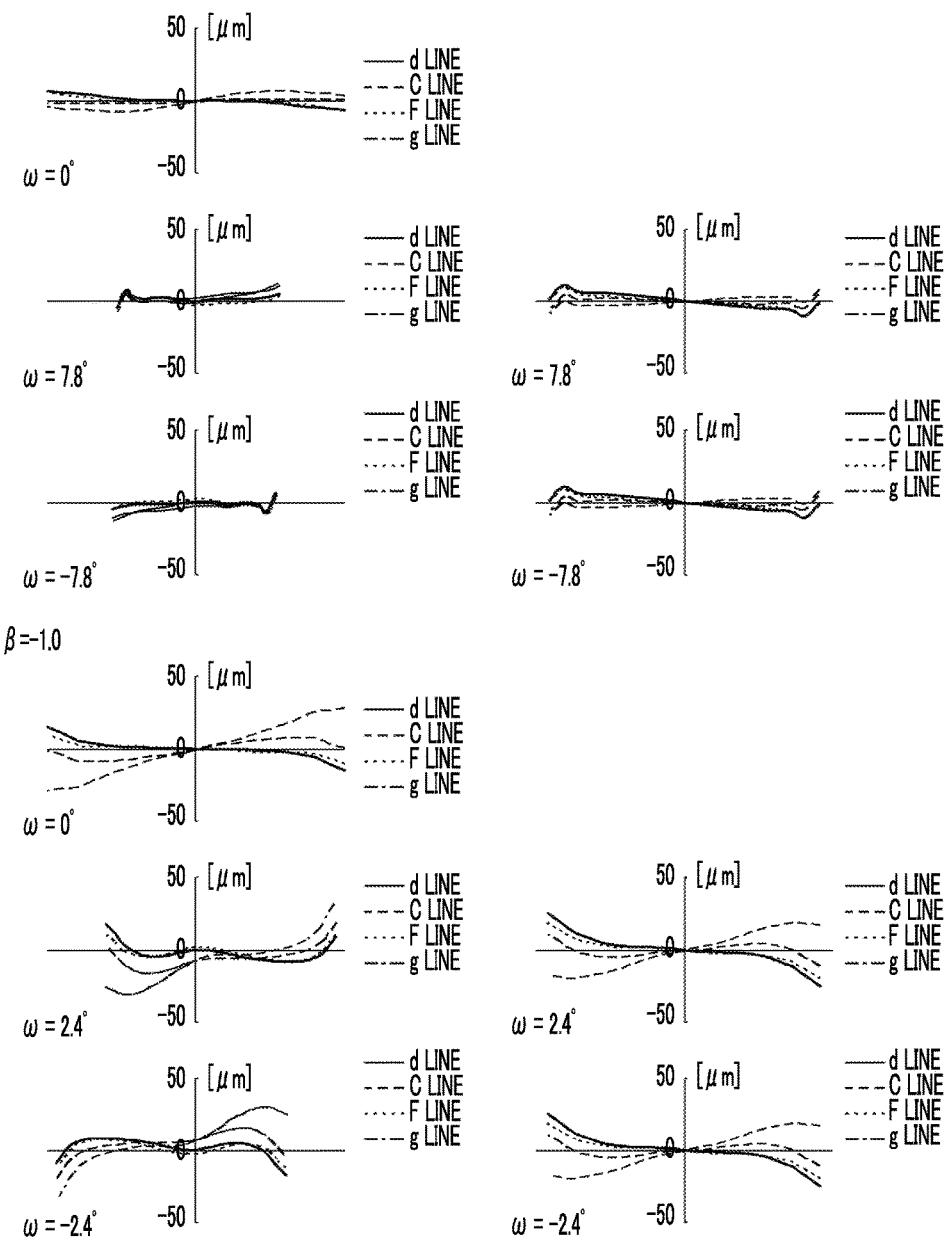
FIG. 19 is a diagram of lateral aberrations of the imaging lens of Example 2 of the present invention.

Next, an imaging lens of Example 2 will be described. FIG. 2 shows a cross-sectional view illustrating a configuration of the imaging lens of Example 2. The imaging lens of Example 2 is configured to have lens groups and the number of lenses which are the same as those in Example 1. In addition, Table 5 shows lens data of the imaging lens of Example 2, Table 6 shows data relating to specifications, Table 7 shows data relating to surface spacings changing during focusing, Table 8 shows data relating to aspherical coefficients, FIG. 10 shows a diagram of aberrations, FIG. 19 shows a diagram of lateral aberrations during the absence of camera-shake correction, and FIG. 20 shows a diagram of lateral aberrations during the presence of camera-shake correction.

TABLE 5

Example 2•Lens Data (n and ν are based on d line)

| Surface Number | Curvature Radius | Surface Spacing | n | ν |
|---|---|---|---|---|
| 1 | 84.2438 | 4.84 | 1.69680 | 55.53 |
| 2 | −137.6965 | 0.20 | | |
| 3 | 69.5240 | 4.53 | 1.53775 | 74.70 |
| 4 | −151.9751 | 0.90 | | |
| 5 | −87.6879 | 1.25 | 1.64769 | 33.79 |
| 6 | 32.7899 | 1.10 | | |
| *7 | 29.5345 | 5.68 | 1.61881 | 63.85 |
| *8 | −134.8570 | DD[8] | | |
| *9 | −115.0114 | 1.20 | 1.58313 | 59.46 |
| *10 | 24.1030 | 3.23 | | |
| 11 | −73.9229 | 1.01 | 1.74950 | 35.33 |
| 12 | 31.6802 | 3.68 | 2.00069 | 25.46 |
| 13 | −244.8243 | DD[13] | | |
| 14(Stop) | ∞ | DD[14] | | |
| 15 | 137.2080 | 3.15 | 1.43875 | 94.66 |
| 16 | −39.6269 | 0.10 | | |
| 17 | 38.2293 | 3.73 | 1.49700 | 81.54 |
| 18 | −63.8847 | 1.00 | 1.84666 | 23.78 |
| 19 | −266.2967 | DD[19] | | |
| 20 | −470.0791 | 2.07 | 1.95906 | 17.47 |
| 21 | −55.5537 | 0.96 | 1.74320 | 49.34 |
| 22 | 29.1706 | 2.20 | | |
| 23 | −181.5881 | 0.94 | 1.53775 | 74.70 |
| 24 | 39.8580 | 3.60 | | |
| 25 | 97.6627 | 2.32 | 1.77250 | 49.60 |
| 26 | −193.9481 | 0.10 | | |
| 27 | 34.6764 | 4.80 | 1.81600 | 46.62 |
| 28 | −104.7593 | 1.07 | 1.92286 | 18.90 |
| 29 | 110.7794 | 27.73 | | |
| 30 | ∞ | 2.85 | 1.51680 | 64.20 |
| 31 | ∞ | 1.00 | | |

TABLE 6

Example 2•Specification (d Line)

| | INF | β = −1.0 |
|---|---|---|
| f | 81.88 | |
| FNo. | 2.88 | 4.15 |
| 2ω [°] | 19.4 | 6.0 |

TABLE 7

Example 2•Variable Surface Spacing

| | INF | β = −1.0 |
|---|---|---|
| DD[8] | 2.61 | 18.82 |
| DD[13] | 18.96 | 2.75 |
| DD[14] | 21.53 | 5.48 |
| DD[19] | 6.50 | 22.55 |

TABLE 8

Example 2•Aspheric Coefficient

| Surface Number | 7 | 8 |
|---|---|---|
| KA | 1.0000000E+00 | 1.0000000E+00 |
| A4 | −4.0798216E−07 | 1.9992990E−06 |
| A6 | −7.8209541E−09 | −2.4236319E−09 |
| A8 | 7.7762349E−11 | 1.7868584E−11 |
| A10 | 3.6176441E−14 | 5.3856264E−13 |
| A12 | 3.2621964E−16 | −5.5318134E−17 |
| A14 | 4.4467420E−18 | −5.7273579E−18 |
| A16 | −3.0154374E−20 | −5.5983798E−20 |
| A18 | −1.2405642E−22 | 4.2849847E−22 |
| A20 | 1.6990698E−24 | 5.6681656E−25 |

| Surface Number | 9 | 10 |
|---|---|---|
| KA | 1.0000000E+00 | 1.0000000E+00 |
| A4 | −3.9904281E−06 | −5.9625976E−06 |
| A6 | 3.1907018E−08 | −8.4879182E−09 |
| A8 | 1.4097739E−10 | 9.9835922E−10 |
| A10 | −3.4209857E−12 | −1.3381427E−11 |
| A12 | −1.3381521E−14 | 3.9216258E−14 |
| A14 | 4.2398535E−16 | 3.8370471E−16 |
| A16 | −9.6428247E−19 | −1.3340680E−18 |
| A18 | −1.1565781E−20 | −8.4565741E−21 |
| A20 | 4.6482568E−23 | 2.0713639E−23 |

Figure 11:
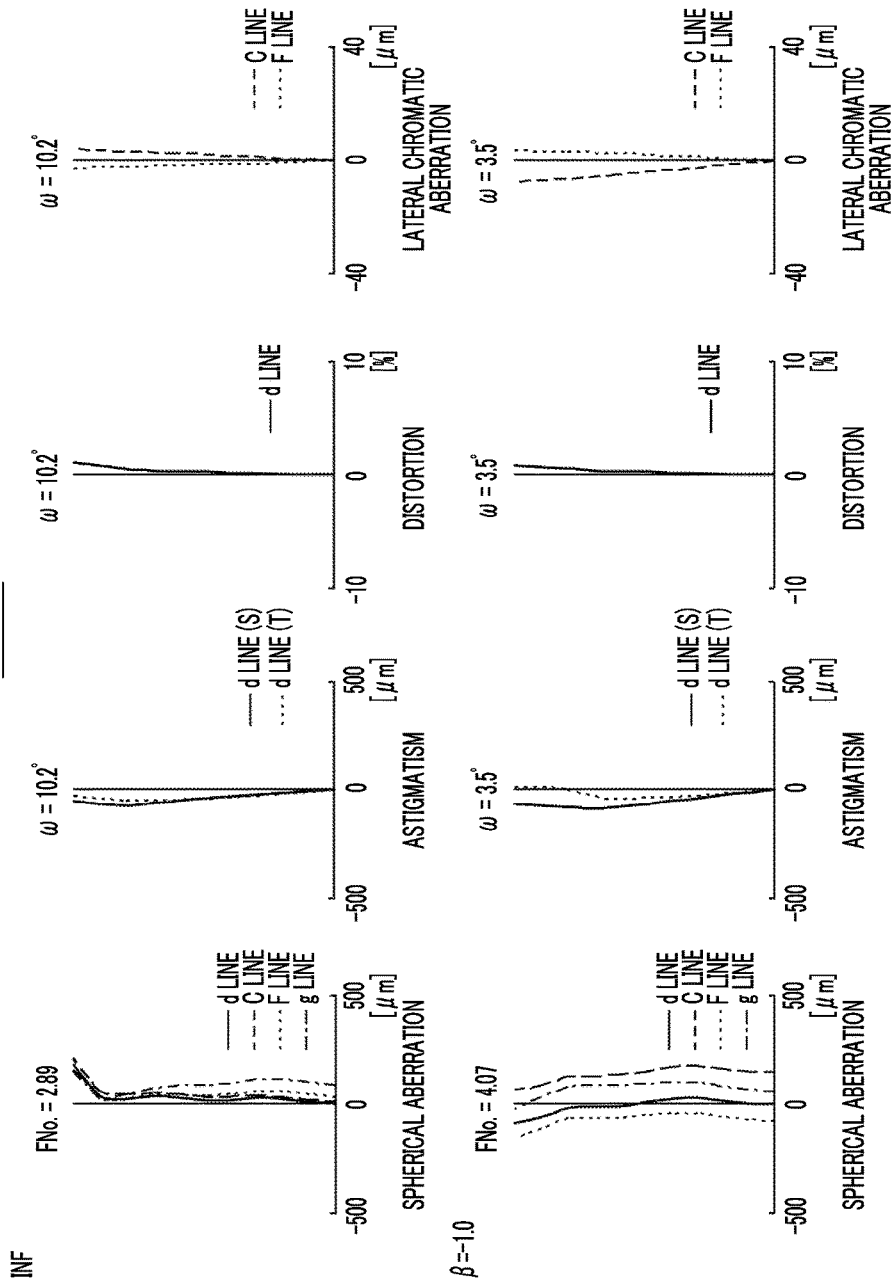
FIG. 11 is a diagram of aberrations of the imaging lens of Example 3 of the present invention.
Figure 21:
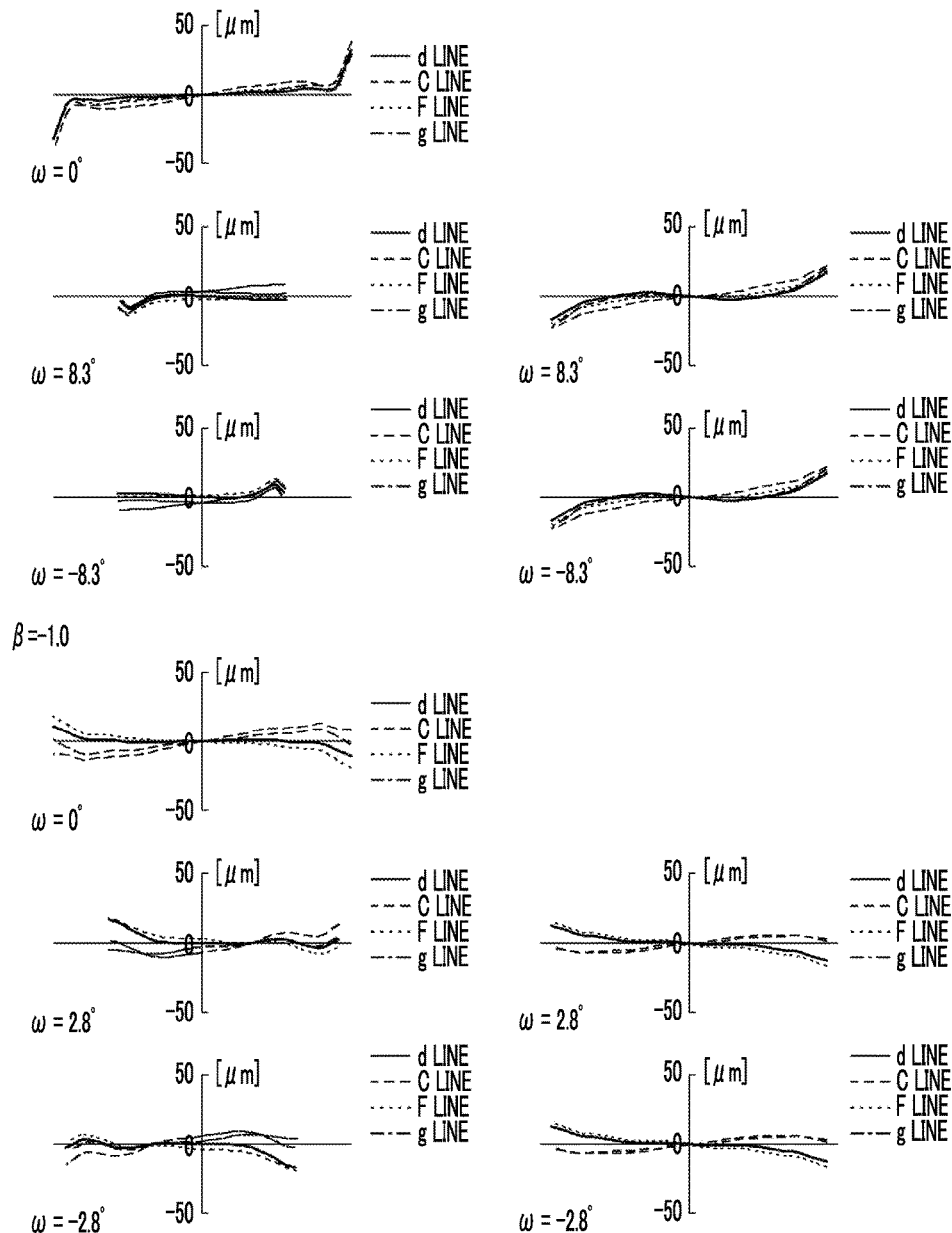
FIG. 21 is a diagram of lateral aberrations of the imaging lens of Example 3 of the present invention.

Next, an imaging lens of Example 3 will be described. FIG. 3 shows a cross-sectional view illustrating a configuration of the imaging lens of Example 3. The imaging lens of Example 3 is configured to have lens groups and the number of lenses which are the same as those in Example 1, except that a fourth-a lens group G4a is composed of two lenses of lenses L4aa and L4ab. In addition, Table 9 shows lens data of the imaging lens of Example 3, Table 10 shows data relating to specifications, Table 11 shows data relating to surface spacings changing during focusing, Table 12 shows data relating to aspherical coefficients, FIG. 11 shows a diagram of aberrations, FIG. 21 shows a diagram of lateral aberrations during the absence of camera-shake correction, and FIG. 22 shows a diagram of lateral aberrations during the presence of camera-shake correction.

TABLE 9

Example 3•Lens Data (n and ν are based on d line)

| Surface Number | Curvature Radius | Surface Spacing | n | ν |
|---|---|---|---|---|
| 1 | 120.7575 | 4.50 | 1.69680 | 55.53 |
| 2 | −120.7575 | 0.10 | | |
| 3 | 58.3491 | 5.50 | 1.53775 | 74.70 |
| 4 | −174.9576 | 1.26 | | |
| 5 | −81.9914 | 1.10 | 1.67270 | 32.10 |
| 6 | 32.3155 | 2.66 | | |
| *7 | 28.4881 | 5.65 | 1.61881 | 63.85 |
| 8 | −82.1900 | DD[8] | | |
| *9 | −110.6367 | 1.35 | 1.58313 | 59.46 |
| *10 | 23.5492 | 2.50 | | |
| 11 | 170.7533 | 0.89 | 1.88300 | 40.76 |
| 12 | 19.3272 | 5.00 | 2.00069 | 25.46 |
| 13 | 74.5524 | DD[13] | | |
| 14(Stop) | ∞ | DD[14] | | |
| 15 | 94.9100 | 4.20 | 1.43875 | 94.94 |
| 16 | −41.8106 | 0.10 | | |
| 17 | 41.8701 | 6.00 | 1.49700 | 81.54 |
| 18 | −28.8418 | 0.95 | 1.74077 | 27.79 |
| 19 | −60.5507 | DD[19] | | |
| 20 | −54.6766 | 3.65 | 1.92119 | 23.96 |
| 21 | −22.3693 | 0.96 | 1.69700 | 48.52 |
| 22 | 26.2331 | 3.84 | | |
| 23 | 38.4822 | 4.20 | 1.91082 | 35.25 |
| 24 | −194.4411 | 1.01 | | |

TABLE 9-continued

Example 3•Lens Data (n and ν are based on d line)

| Surface Number | Curvature Radius | Surface Spacing | n | ν |
|---|---|---|---|---|
| 25 | −76.3139 | 4.43 | 1.88300 | 40.76 |
| 26 | −32.0676 | 1.01 | 1.80809 | 22.76 |
| 27 | 190.9022 | 26.56 | | |
| 28 | ∞ | 2.85 | 1.51680 | 64.20 |
| 29 | ∞ | 1.00 | | |

TABLE 10

Example 3•Specification (d Line)

| | INF | β = −1.0 |
|---|---|---|
| f | 77.81 | |
| FNo. | 2.89 | 4.07 |
| 2ω [°] | 20.4 | 7.0 |

TABLE 11

Example 3•Variable Surface Spacing

| | INF | β = −1.0 |
|---|---|---|
| DD[8] | 1.97 | 15.99 |
| DD[13] | 17.52 | 3.50 |
| DD[14] | 24.36 | 9.97 |
| DD[19] | 6.56 | 20.95 |

TABLE 12

Example 3•Aspheric Coefficient

| Surface Number | 7 | 9 |
|---|---|---|
| KA | 1.0000000E+00 | 1.0000000E+00 |
| A4 | −3.4006290E−06 | −1.4025164E−05 |
| A6 | −1.8603345E−08 | −2.5559372E−08 |
| A8 | 3.6505007E−10 | 3.9882976E−09 |
| A10 | −4.9201953E−12 | −7.2989117E−11 |
| A12 | 4.0232261E−14 | 7.0785694E−13 |
| A14 | −1.9651082E−16 | −4.0330754E−15 |
| A16 | 5.2512795E−19 | 1.2804472E−17 |
| A18 | −5.9180911E−22 | −1.7268578E−20 |

| Surface Number | 10 |
|---|---|
| KA | 1.0000000E+00 |
| A4 | −1.7083985E−05 |
| A6 | −2.0556256E−07 |
| A8 | 9.5584679E−09 |
| A10 | −1.7322201E−10 |
| A12 | 1.7739436E−12 |
| A14 | −1.0806291E−14 |
| A16 | 3.6950285E−17 |
| A18 | −5.3825936E−20 |

Figure 12:
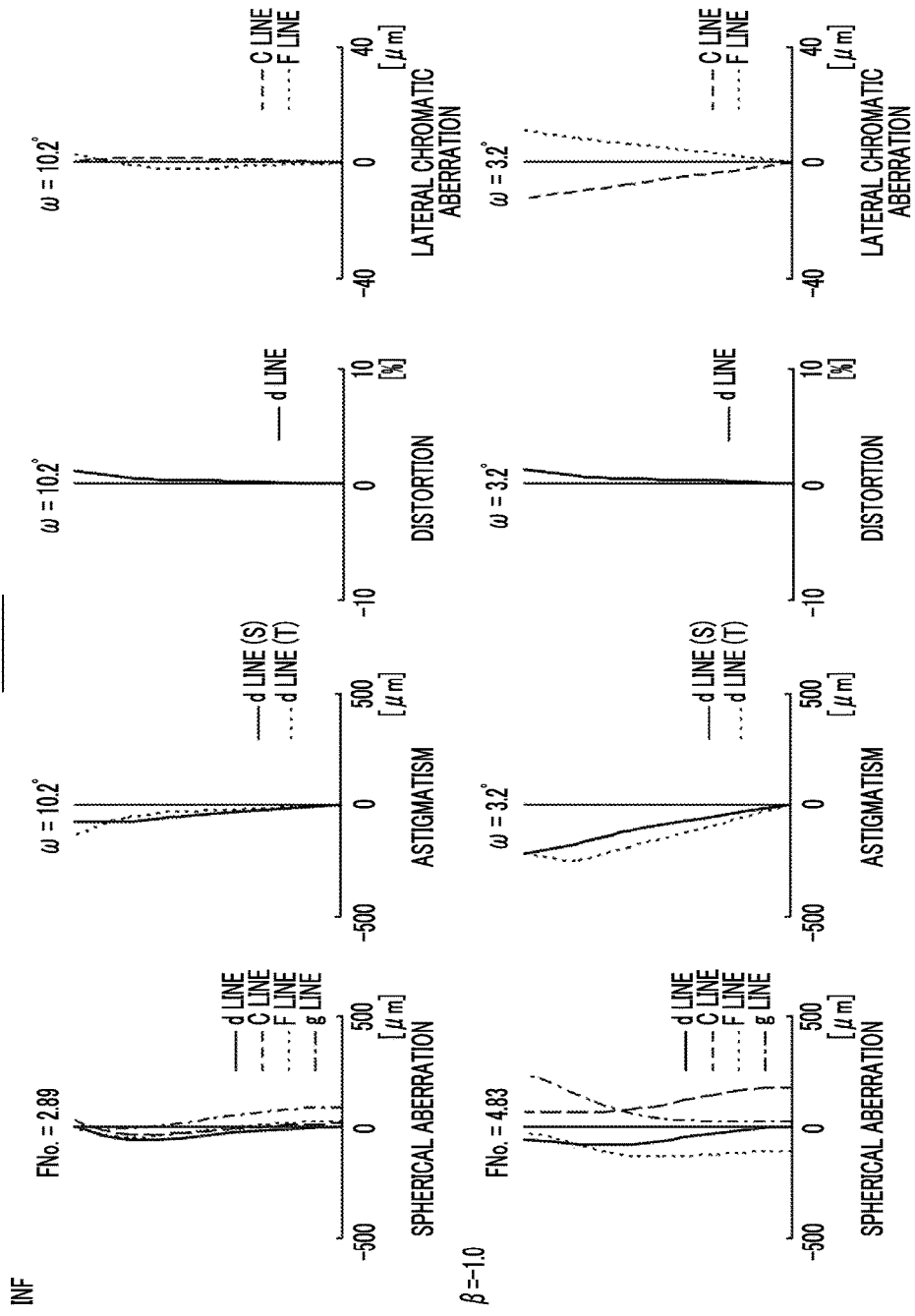
FIG. 12 is a diagram of aberrations of the imaging lens of Example 4 of the present invention
Figure 23:
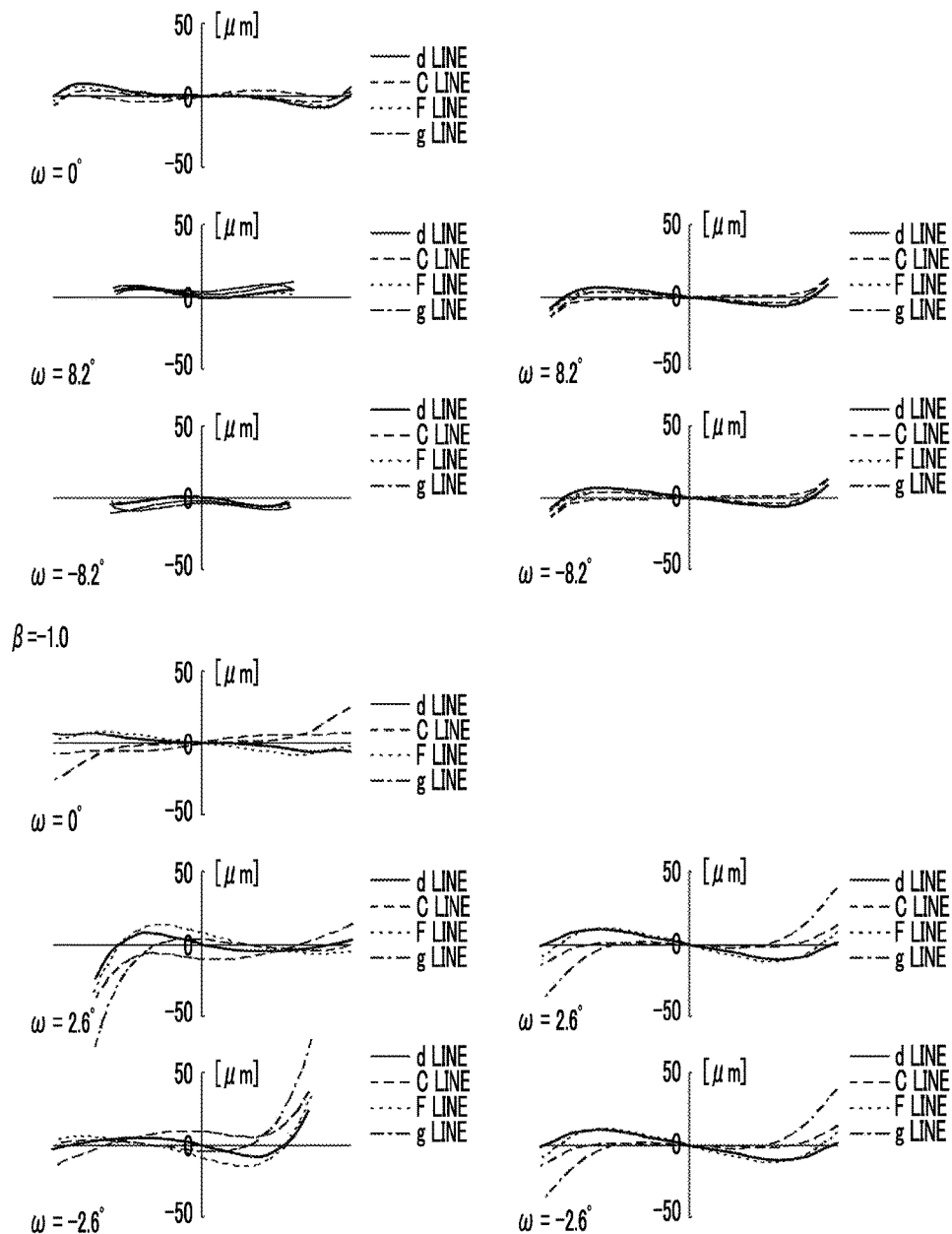
FIG. 23 is a diagram of lateral aberrations of the imaging lens of Example 4 of the present invention.

Next, an imaging lens of Example 4 will be described. FIG. 4 shows a cross-sectional view illustrating a configuration of the imaging lens of Example 4. The imaging lens of Example 4 is configured to have lens groups and the number of lenses which are the same as those in Example 3. In addition, Table 13 shows lens data of the imaging lens of Example 4, Table 14 shows data relating to specifications, Table 15 shows data relating to surface spacings changing during focusing, FIG. 12 shows a diagram of aberrations, FIG. 23 shows a diagram of lateral aberrations during the absence of camera-shake correction, and FIG. 24 shows a diagram of lateral aberrations during the presence of camera-shake correction.

TABLE 13

Example 4•Lens Data (n and ν are based on d line)

| Surface Number | Curvature Radius | Surface Spacing | n | ν |
|---|---|---|---|---|
| 1 | 122.9390 | 4.44 | 1.80400 | 46.58 |
| 2 | −122.9390 | 0.10 | | |
| 3 | 39.2345 | 4.16 | 1.53775 | 74.70 |
| 4 | 221.7874 | 1.26 | | |
| 5 | −159.9964 | 1.10 | 1.67270 | 32.10 |
| 6 | 25.7668 | 3.50 | | |
| 7 | 28.5540 | 5.51 | 1.61800 | 63.33 |
| 8 | −118.3632 | DD[8] | | |
| 9 | −102.3171 | 0.92 | 1.51742 | 52.43 |
| 10 | 25.7862 | 2.72 | | |
| 11 | −474.6884 | 0.89 | 1.83481 | 42.72 |
| 12 | 22.3038 | 3.75 | 2.00069 | 25.46 |
| 13 | 99.0563 | DD[13] | | |
| 14(Stop) | ∞ | DD[14] | | |
| 15 | 317.6974 | 4.20 | 1.43875 | 94.94 |
| 16 | −41.0480 | 0.10 | | |
| 17 | 40.3575 | 6.00 | 1.49700 | 81.54 |
| 18 | −28.4002 | 1.50 | 1.74077 | 27.79 |
| 19 | −54.7673 | DD[19] | | |
| 20 | −52.6190 | 3.65 | 1.92119 | 23.96 |
| 21 | −22.8922 | 0.96 | 1.69350 | 53.20 |
| 22 | 29.6381 | 4.49 | | |
| 23 | 40.5146 | 5.60 | 1.72000 | 41.98 |
| 24 | −48.2907 | 2.50 | | |
| 25 | −38.3276 | 3.98 | 1.88300 | 40.76 |
| 26 | −25.7514 | 1.57 | 1.80809 | 22.76 |
| 27 | −483.2442 | 27.72 | | |
| 28 | ∞ | 2.85 | 1.51680 | 64.20 |
| 29 | ∞ | 1.00 | | |

TABLE 14

Example 4•Specification (d Line)

| | INF | β = −1.0 |
|---|---|---|
| f | 78.36 | |
| FNo. | 2.89 | 4.83 |
| 2ω [°] | 20.4 | 6.4 |

TABLE 15

Example 4•Variable Surface Spacing

| | INF | β = −1.0 |
|---|---|---|
| DD[8] | 2.18 | 18.53 |
| DD[13] | 19.62 | 3.27 |
| DD[14] | 20.53 | 5.37 |
| DD[19] | 6.56 | 21.72 |

Figure 13:
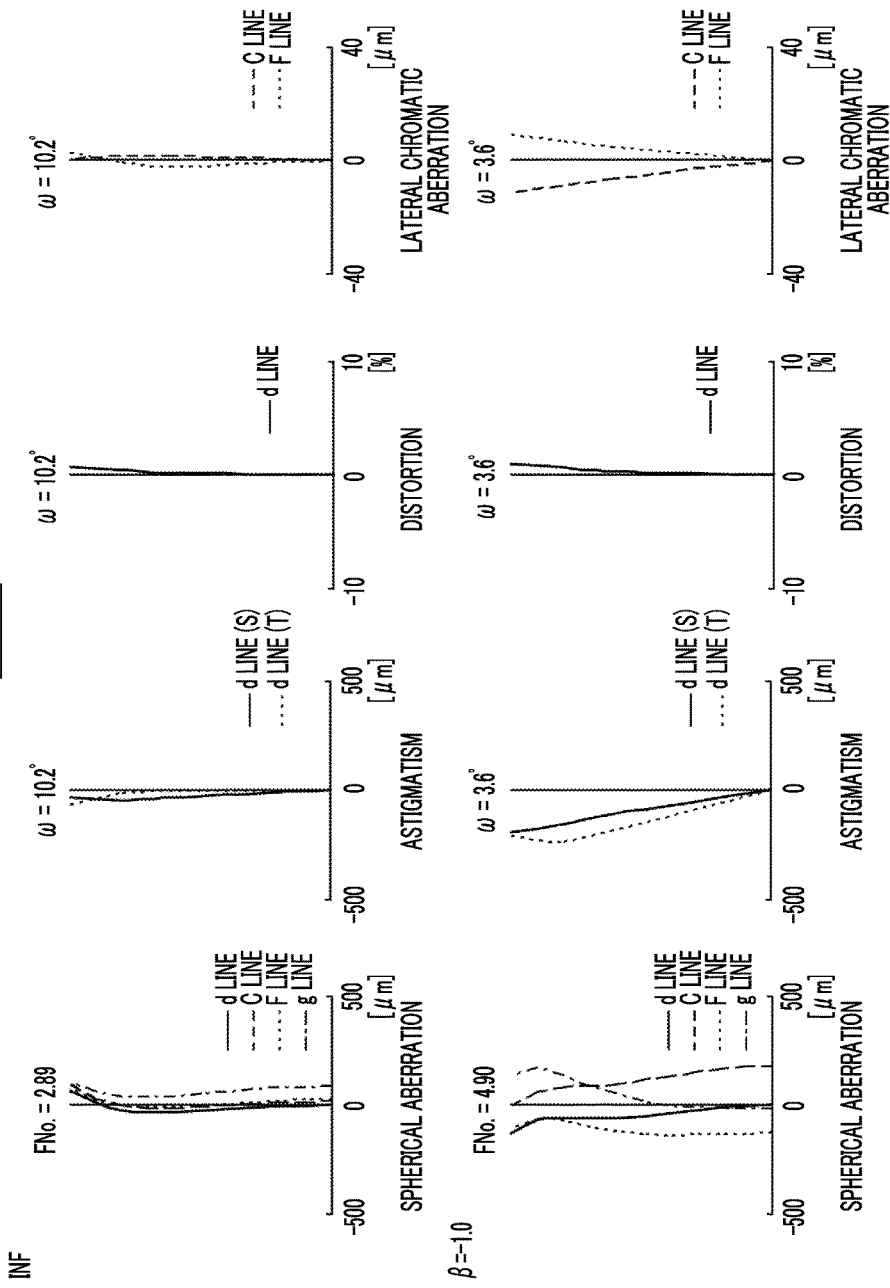
FIG. 13 is a diagram of aberrations of the imaging lens of Example 5 of the present invention.
Figure 25:
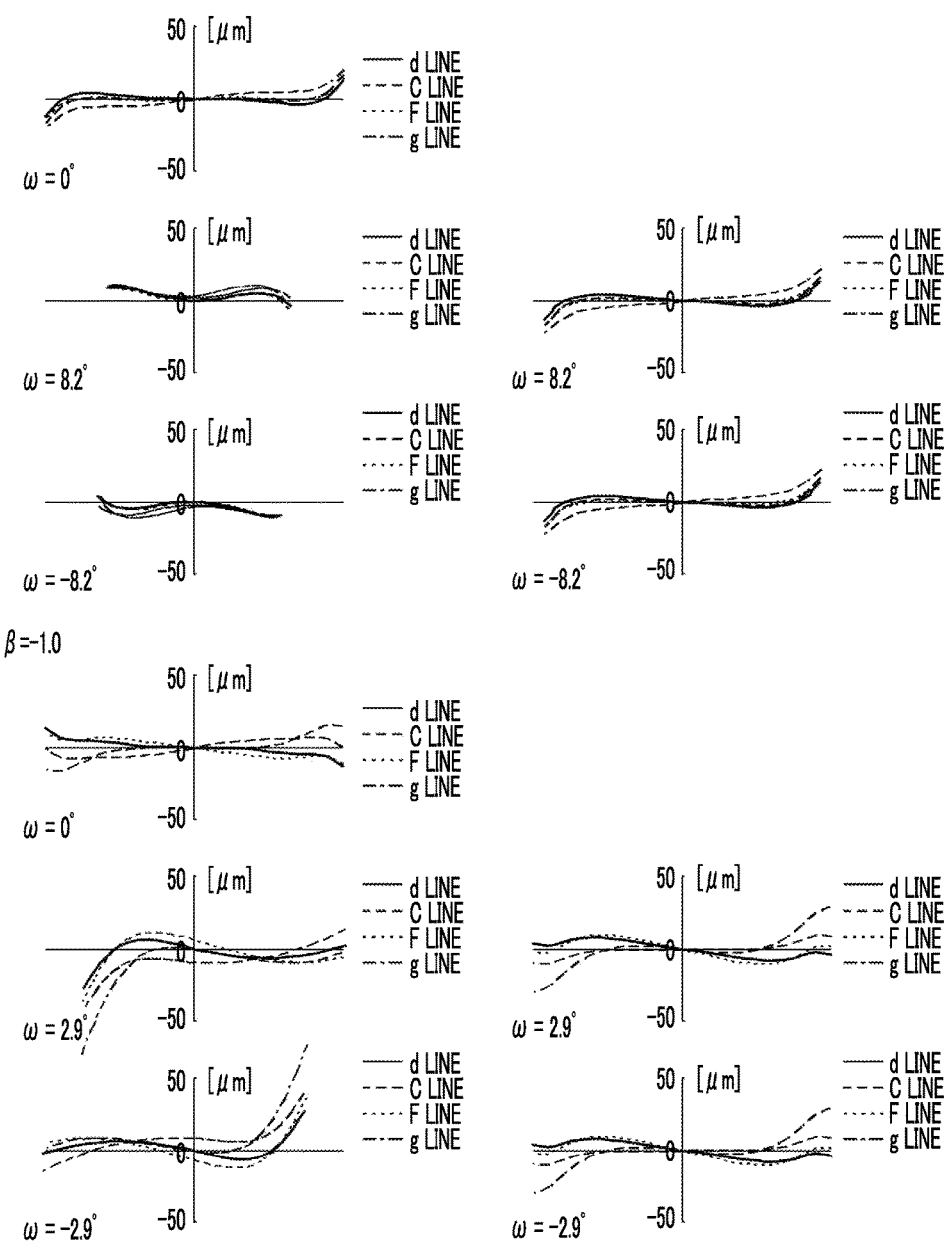
FIG. 25 is a diagram of lateral aberrations of the imaging lens of Example 5 of the present invention.

Next, an imaging lens of Example 5 will be described. FIG. 5 shows a cross-sectional view illustrating a configuration of the imaging lens of Example 5. The imaging lens of Example 5 is configured to have lens groups and the number of lenses which are the same as those in Example 3. In addition, Table 16 shows lens data of the imaging lens of Example 5, Table 17 shows data relating to specifications, Table 18 shows data relating to surface spacings changing during focusing, FIG. 13 shows a diagram of aberrations, FIG. 25 shows a diagram of lateral aberrations during the absence of camera-shake correction, and FIG. 26 shows a diagram of lateral aberrations during the presence of camera-shake correction.

TABLE 16

Example 5•Lens Data (n and ν are based on d line)

| Surface Number | Curvature Radius | Surface Spacing | n | ν |
|---|---|---|---|---|
| 1 | 121.4288 | 4.00 | 1.80400 | 46.58 |
| 2 | −121.4288 | 0.10 | | |
| 3 | 36.7569 | 3.99 | 1.53775 | 74.70 |
| 4 | 193.3916 | 1.19 | | |
| 5 | −159.9908 | 1.10 | 1.67270 | 32.10 |
| 6 | 24.0649 | 3.50 | | |
| 7 | 26.6908 | 5.33 | 1.61800 | 63.33 |
| 8 | −124.4782 | DD[8] | | |
| 9 | −152.3447 | 0.92 | 1.51742 | 52.43 |
| 10 | 24.1257 | 2.92 | | |
| 11 | −124.7857 | 0.89 | 1.83481 | 42.72 |
| 12 | 24.6072 | 3.53 | 2.00069 | 25.46 |
| 13 | 228.5168 | DD[13] | | |
| 14(Stop) | ∞ | DD[14] | | |
| 15 | 1205.1409 | 3.55 | 1.43875 | 94.94 |
| 16 | −38.5291 | 0.10 | | |
| 17 | 39.9630 | 6.00 | 1.49700 | 81.54 |
| 18 | −28.4000 | 1.01 | 1.74077 | 27.79 |
| 19 | −54.8549 | DD[19] | | |
| 20 | −53.7791 | 3.65 | 1.92119 | 23.96 |
| 21 | −22.1703 | 0.96 | 1.69350 | 53.20 |
| 22 | 28.2097 | 3.84 | | |
| 23 | 36.4763 | 5.60 | 1.72000 | 41.98 |
| 24 | −59.9309 | 2.50 | | |
| 25 | −39.3483 | 3.15 | 1.88300 | 40.76 |
| 26 | −23.4945 | 1.01 | 1.80809 | 22.76 |
| 27 | −461.5772 | 28.19 | | |
| 28 | ∞ | 2.85 | 1.51680 | 64.20 |
| 29 | ∞ | 1.00 | | |

TABLE 17

Example 5•Specification (d Line)

| | INF | β = −1.0 |
|---|---|---|
| f' | 78.03 | |
| FNo. | 2.89 | 4.90 |
| 2ω [°] | 20.4 | 7.2 |

TABLE 18

Example 5•Variable Surface Spacing

| | INF | β = −1.0 |
|---|---|---|
| DD[8] | 2.02 | 16.82 |
| DD[13] | 17.66 | 2.86 |
| DD[14] | 19.75 | 4.22 |
| DD[19] | 6.54 | 22.07 |

Figure 14:
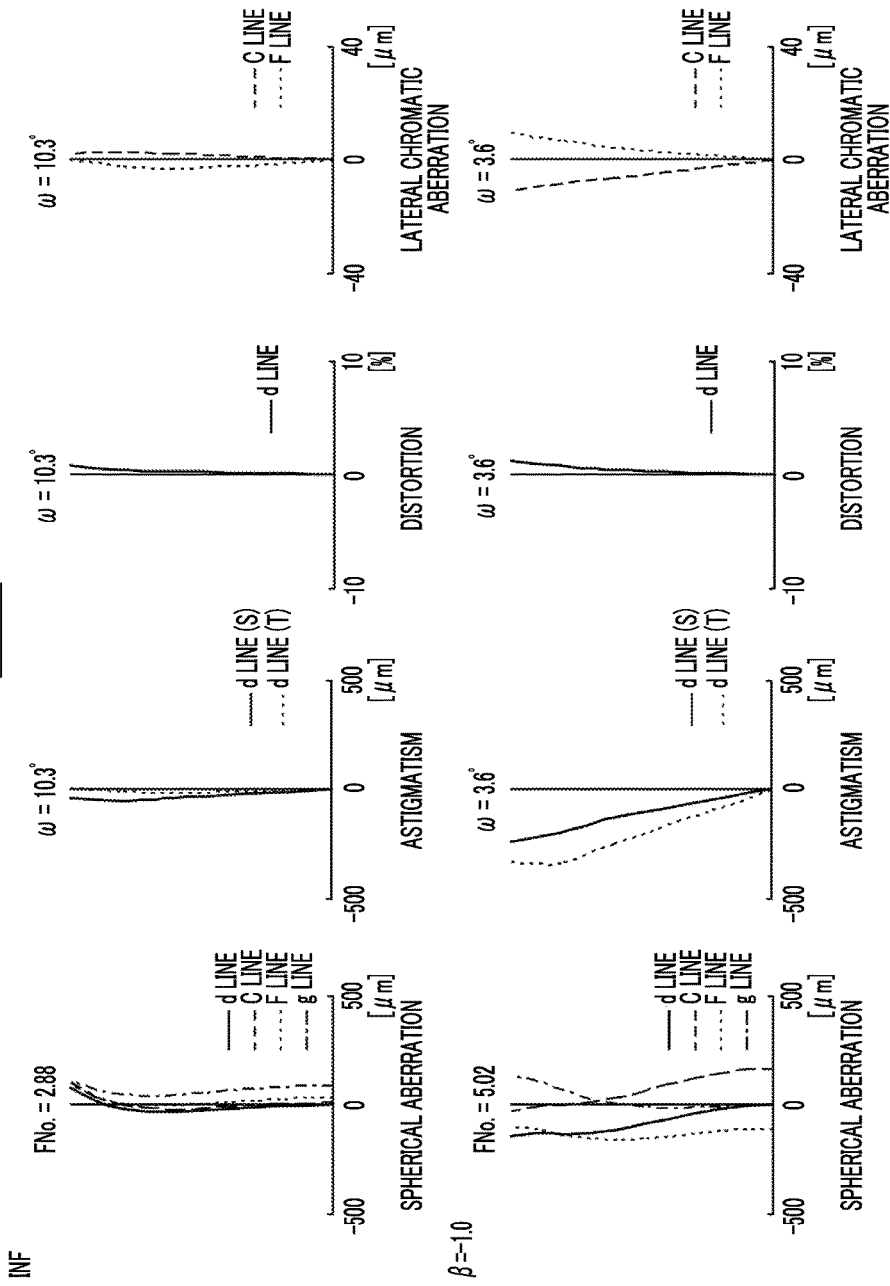
FIG. 14 is a diagram of aberrations of the imaging lens of Example 6 of the present invention.
Figure 27:
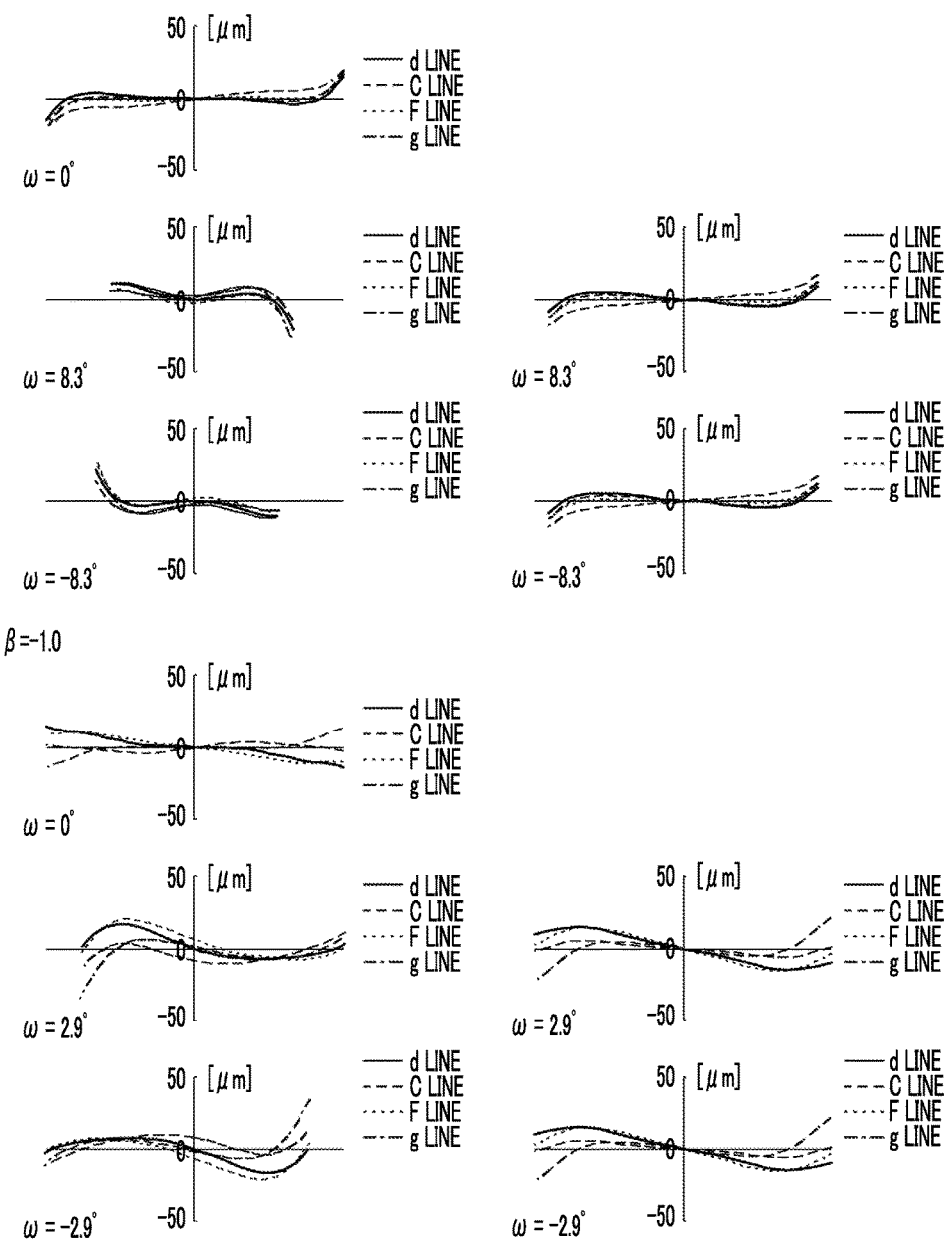
FIG. 27 is a diagram of lateral aberrations of the imaging lens of Example 6 of the present invention.

Next, an imaging lens of Example 6 will be described. FIG. 6 shows a cross-sectional view illustrating a configuration of the imaging lens of Example 6. The imaging lens of Example 6 is configured to have lens groups and the number of lenses which are the same as those in Example 3. In addition, Table 19 shows lens data of the imaging lens of Example 6, Table 20 shows data relating to specifications, Table 21 shows data relating to surface spacings changing during focusing, FIG. 14 shows a diagram of aberrations, FIG. 27 shows a diagram of lateral aberrations during the absence of camera-shake correction, and FIG. 28 shows a diagram of lateral aberrations during the presence of camera-shake correction.

TABLE 19

Example 6•Lens Data (n and ν are based on d line)

| Surface Number | Curvature Radius | Surface Spacing | n | ν |
|---|---|---|---|---|
| 1 | 111.1836 | 4.26 | 1.67790 | 55.34 |
| 2 | −111.1836 | 0.10 | | |
| 3 | 39.2964 | 4.10 | 1.49700 | 81.54 |
| 4 | 375.8797 | 0.88 | | |
| 5 | −158.1262 | 1.10 | 1.64769 | 33.79 |
| 6 | 23.6588 | 2.36 | | |
| 7 | 25.7630 | 5.28 | 1.65160 | 58.55 |
| 8 | −222.4108 | DD[8] | | |
| 9 | −180.6770 | 0.92 | 1.51742 | 52.43 |
| 10 | 25.2874 | 2.80 | | |
| 11 | −190.5452 | 0.89 | 1.83481 | 42.72 |
| 12 | 24.9519 | 3.43 | 2.00069 | 25.46 |
| 13 | 164.4824 | DD[13] | | |
| 14(Stop) | ∞ | DD[14] | | |
| 15 | 247.0679 | 3.55 | 1.43875 | 94.94 |
| 16 | −39.3025 | 0.10 | | |
| 17 | 37.7333 | 6.06 | 1.49700 | 81.54 |
| 18 | −28.3997 | 0.95 | 1.72825 | 28.46 |
| 19 | −59.2317 | DD[19] | | |
| 20 | −50.1768 | 3.66 | 1.92119 | 23.96 |
| 21 | −20.7585 | 0.96 | 1.69350 | 53.20 |
| 22 | 26.1737 | 3.84 | | |
| 23 | 36.0889 | 5.22 | 1.72342 | 37.95 |
| 24 | −52.9615 | 2.07 | | |
| 25 | −38.0654 | 3.15 | 1.88300 | 40.76 |
| 26 | −21.2315 | 1.01 | 1.80809 | 22.76 |
| 27 | ∞ | 26.54 | | |
| 28 | ∞ | 2.85 | 1.51680 | 64.20 |
| 29 | ∞ | 1.00 | | |

TABLE 20

Example 6•Specification (d Line)

| | INF | β = −1.0 |
|---|---|---|
| f' | 77.82 | |
| FNo. | 2.88 | 5.02 |
| 2ω [°] | 20.6 | 7.2 |

TABLE 21

Example 6•Variable Surface Spacing

| | INF | β = −1.0 |
|---|---|---|
| DD[8] | 2.25 | 18.43 |
| DD[13] | 19.15 | 2.97 |
| DD[14] | 19.51 | 4.50 |
| DD[19] | 6.54 | 21.55 |

Figure 15:
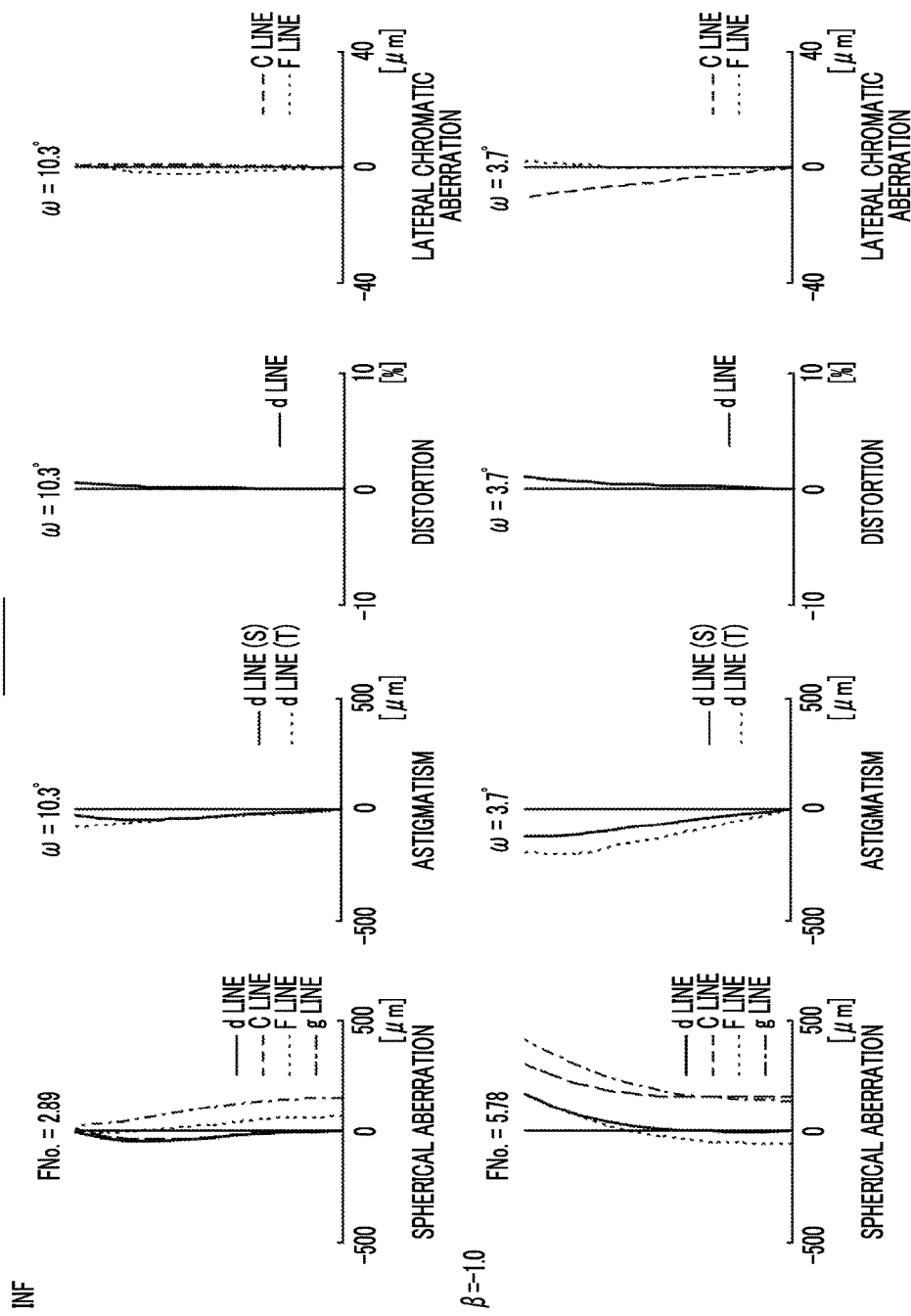
FIG. 15 is a diagram of aberrations the imaging lens of Example 7 of the present invention.
Figure 29:
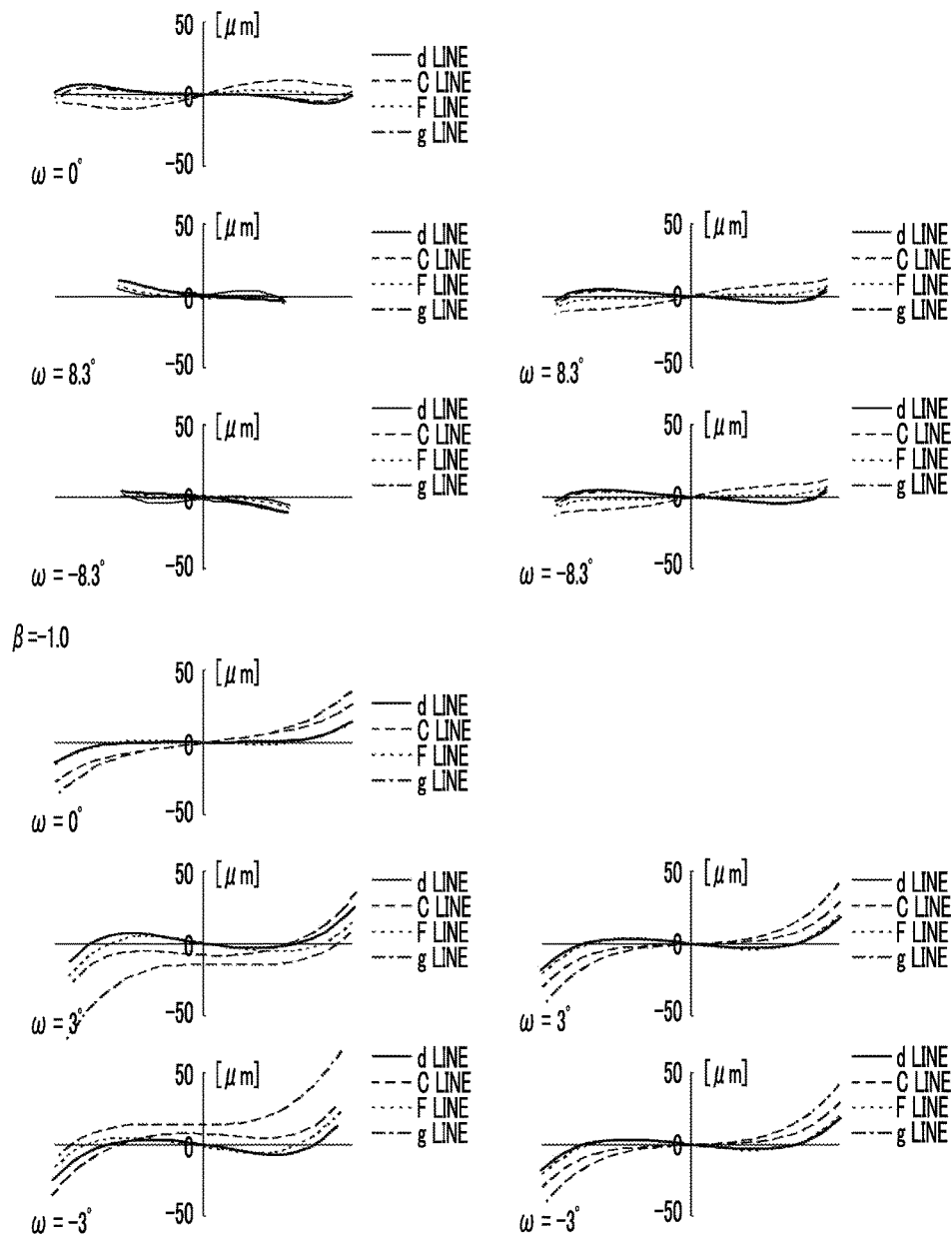
FIG. 29 is a diagram of lateral aberrations of the imaging lens of Example 7 of the present invention

Next, an imaging lens of Example 7 will be described. FIG. 7 shows a cross-sectional view illustrating a configuration of the imaging lens of Example 7. The imaging lens of Example 7 is configured to have lens groups and the number of lenses which are the same as those in Example 3. In addition, Table 22 shows lens data of the imaging lens of Example 7, Table 23 shows data relating to specifications, Table 24 shows data relating to surface spacings changing during focusing, FIG. 15 shows a diagram of aberrations, FIG. 29 shows a diagram of lateral aberrations during the absence of camera-shake correction, and FIG. 30 shows a diagram of lateral aberrations during the presence of camera-shake correction.

TABLE 22

Example 7·Lens Data (n and ν are based on d line)

| Surface Number | Curvature Radius | Surface Spacing | n | ν |
|---|---|---|---|---|
| 1 | 148.0803 | 4.03 | 1.72000 | 43.69 |
| 2 | −112.1842 | 0.10 | | |
| 3 | 38.7577 | 3.96 | 1.61800 | 63.33 |
| 4 | 282.8720 | 1.00 | | |
| 5 | −288.6580 | 1.10 | 1.80518 | 25.42 |
| 6 | 25.6398 | 2.37 | | |
| 7 | 27.9652 | 4.45 | 1.85150 | 40.78 |
| 8 | 515.5395 | DD[8] | | |
| 9 | −413.1115 | 0.92 | 1.58144 | 40.75 |
| 10 | 24.2048 | 2.83 | | |
| 11 | −2515.9481 | 0.89 | 1.74950 | 35.33 |
| 12 | 22.4465 | 3.42 | 2.00272 | 19.32 |
| 13 | 75.6665 | DD[13] | | |
| 14(Stop) | ∞ | DD[14] | | |
| 15 | 130.8126 | 3.90 | 1.43875 | 94.94 |
| 16 | −38.1840 | 0.30 | | |
| 17 | 38.6845 | 5.50 | 1.53775 | 74.70 |
| 18 | −28.9788 | 1.10 | 1.72825 | 28.46 |
| 19 | −83.6621 | DD[19] | | |
| 20 | −85.2200 | 3.65 | 1.92119 | 23.96 |
| 21 | −20.8860 | 0.96 | 1.80400 | 46.58 |
| 22 | 26.4316 | 4.00 | | |
| 23 | 34.8000 | 5.47 | 1.85025 | 30.05 |
| 24 | −46.3001 | 0.50 | | |
| 25 | −48.3980 | 3.10 | 1.83481 | 42.72 |
| 26 | −25.6673 | 1.00 | 1.92286 | 20.88 |
| 27 | 108.9604 | 26.55 | | |
| 28 | ∞ | 2.85 | 1.51680 | 64.20 |
| 29 | ∞ | 1.00 | | |

TABLE 23

Example 7·Specification (d Line)

| | INF | β = −1.0 |
|---|---|---|
| f | 77.72 | |
| FNo. | 2.89 | 5.78 |
| 2ω [°] | 20.6 | 7.4 |

TABLE 24

Example 7·Variable Surface Spacing

| | INF | β = −1.0 |
|---|---|---|
| DD[8] | 2.57 | 18.01 |
| DD[13] | 18.89 | 3.45 |
| DD[14] | 20.83 | 5.59 |
| DD[19] | 6.54 | 21.78 |

Figure 8:
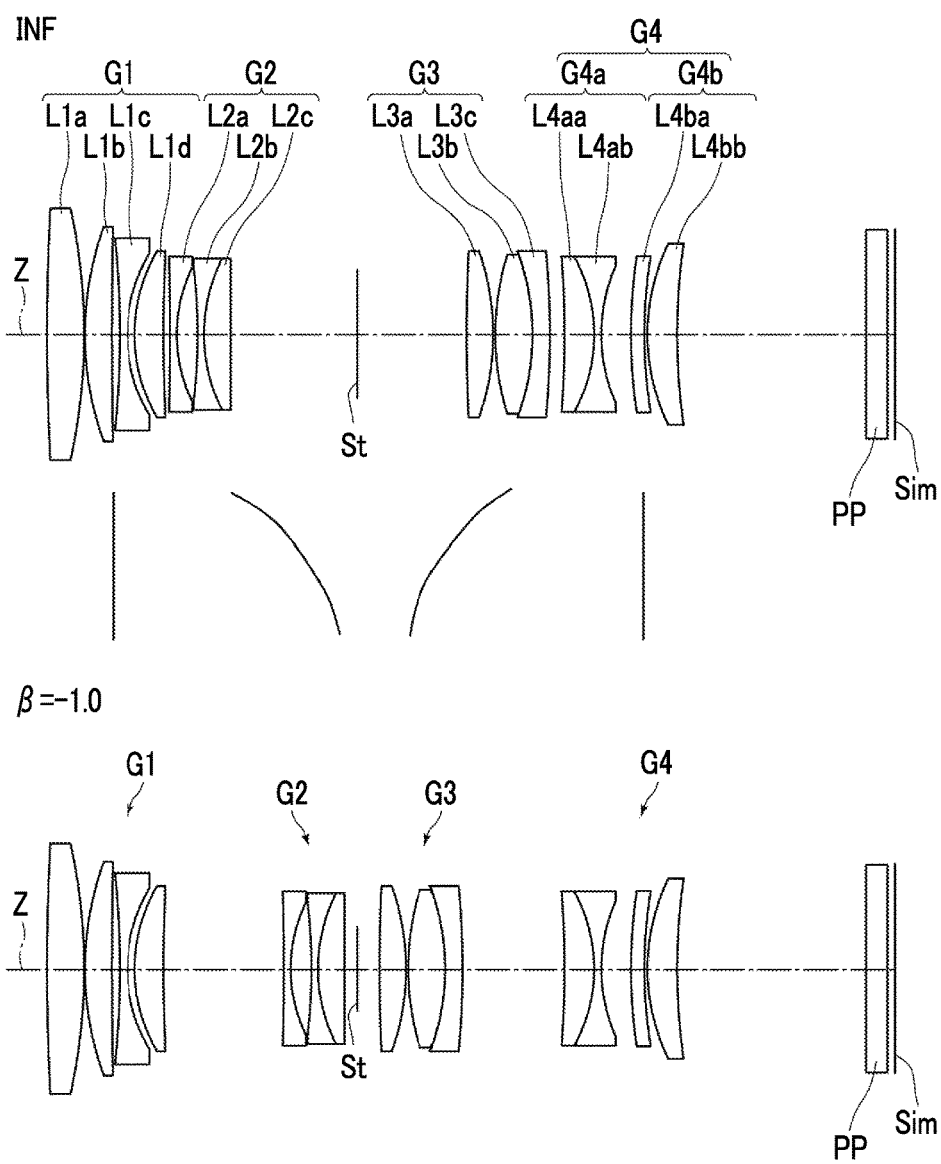
FIG. 8 is a cross-sectional view illustrating a lens configuration of an imaging lens of Example 8 of the present invention.
Figure 16:
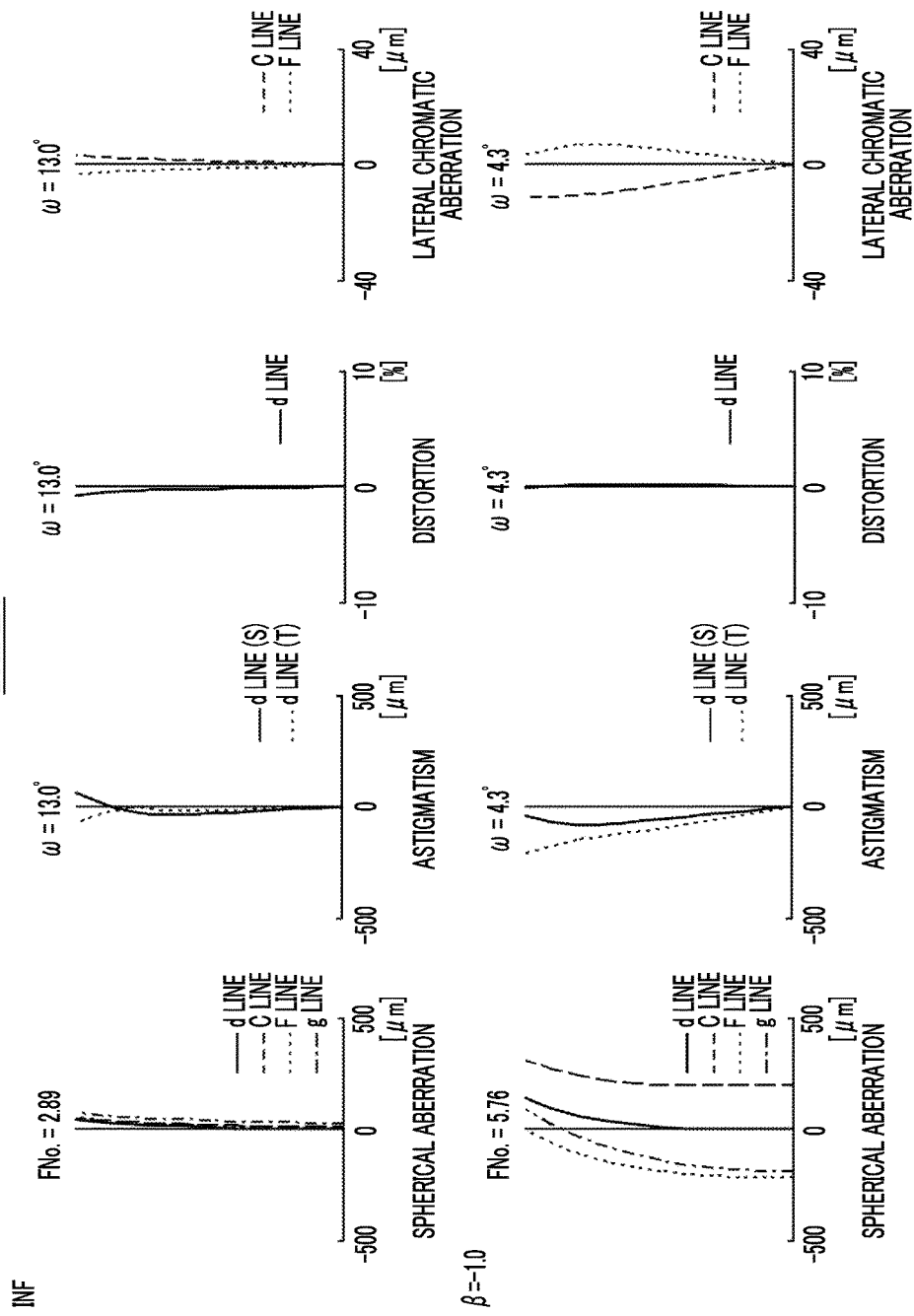
FIG. 16 is a diagram of aberrations the imaging lens of Example 8 of the present invention.

Next, an imaging lens of Example 8 will be described. FIG. 8 shows a cross-sectional view illustrating a configuration of the imaging lens of Example 8. The imaging lens of Example 8 is configured to have lens groups and the number of lenses which are the same as those in Example 3, except that a fourth-b lens group G4b is composed of two lenses of lenses L4ba and L4bb. In addition, Table 25 shows lens data of the imaging lens of Example 8, Table 26 shows data relating to specifications, Table 27 shows data relating to surface spacings changing during focusing, FIG. 16 shows a diagram of aberrations, FIG. 31 shows a diagram of lateral aberrations during the absence of camera-shake correction, and FIG. 32 shows a diagram of lateral aberrations during the presence of camera-shake correction.

TABLE 25

Example 8·Lens Data (n and ν are based on d line)

| Surface Number | Curvature Radius | Surface Spacing | n | ν |
|---|---|---|---|---|
| 1 | 325.1574 | 5.00 | 1.72916 | 54.68 |
| 2 | −79.0740 | 0.10 | | |
| 3 | 42.6810 | 3.64 | 1.78800 | 47.37 |
| 4 | 724.6640 | 1.08 | | |
| 5 | −125.9666 | 1.10 | 1.71736 | 29.52 |
| 6 | 21.1617 | 1.04 | | |
| 7 | 22.3897 | 3.90 | 1.85150 | 40.78 |
| 8 | 214.9291 | DD[8] | | |
| 9 | −440.0560 | 0.92 | 1.67270 | 32.10 |
| 10 | 20.8243 | 2.80 | | |
| 11 | −77.9317 | 0.87 | 1.69895 | 30.13 |
| 12 | 22.8389 | 3.58 | 2.00272 | 19.32 |
| 13 | 7632.2477 | DD[13] | | |
| 14(Stop) | ∞ | DD[14] | | |
| 15 | 239.5460 | 3.57 | 1.49700 | 81.54 |
| 16 | −34.0090 | 0.30 | | |
| 17 | 36.7864 | 4.99 | 1.69680 | 55.53 |
| 18 | −32.1878 | 2.34 | 1.92286 | 18.90 |
| 19 | −121.7957 | DD[19] | | |
| 20 | −139.3993 | 4.00 | 1.92119 | 23.96 |
| 21 | −21.7994 | 0.96 | 1.83481 | 42.72 |
| 22 | 22.9173 | 4.00 | | |
| 23 | 73.5605 | 1.80 | 1.51680 | 64.20 |
| 24 | 66.0768 | 0.41 | | |
| 25 | 28.1795 | 4.00 | 1.75500 | 52.32 |
| 26 | 87.0844 | 25.64 | | |
| 27 | ∞ | 2.85 | 1.51680 | 64.20 |
| 28 | ∞ | 1.00 | | |

TABLE 26

Example 8·Specification (d Line)

| | INF | β = −1.0 |
|---|---|---|
| f | 61.73 | |
| FNo. | 2.89 | 5.76 |
| 2ω [°] | 26.0 | 8.6 |

TABLE 27

Example 8·Variable Surface Spacing

| | INF | β = −1.0 |
|---|---|---|
| DD[8] | 0.87 | 16.20 |
| DD[13] | 17.09 | 1.76 |
| DD[14] | 14.70 | 2.95 |
| DD[19] | 1.97 | 13.72 |

Table 28 shows values corresponding to Conditional Expressions (1) to (9) of the imaging lenses of Examples 1 to 8. Meanwhile, the d line is used as a reference wavelength in all the examples, and values shown in the following Table 28 are equivalent to those at this reference wavelength.

TABLE 28

| Number | Conditional Expression | Example 1 | Example 2 | Example 3 | Example 4 |
|---|---|---|---|---|---|
| (1) | \| f4a/f \| | 0.325 | 0.296 | 0.377 | 0.405 |
| (2) | ν4ab − ν4aa | 29.2 | 31.9 | 24.6 | 29.2 |
| (3) | ν1b − ν1c | 45.8 | 40.9 | 42.6 | 42.6 |

TABLE 28-continued

| Number | Conditional Expression | | | | |
|---|---|---|---|---|---|
| (4) | f1/f | 0.563 | 0.551 | 0.556 | 0.605 |
| (5) | \|f2/f\| | 0.394 | 0.456 | 0.388 | 0.421 |
| (6) | f3/f | 0.463 | 0.490 | 0.430 | 0.447 |
| (7) | \|f4/f\| | 1.295 | 1.421 | 0.758 | 0.889 |
| (8) | \|(1 − β4a) × β4b\| | 1.450 | 1.462 | 1.319 | 1.346 |
| (9) | ν 4ac | 74.7 | 74.7 | — | — |

| Number | Conditional Expression | Example 5 | Example 6 | Example 7 | Example 8 |
|---|---|---|---|---|---|
| (1) | \|f4a/f\| | 0.401 | 0.372 | 0.355 | 0.409 |
| (2) | ν4ab − ν4aa | 29.2 | 29.2 | 22.6 | 18.8 |
| (3) | ν1b − ν1c | 42.6 | 47.8 | 37.9 | 17.9 |
| (4) | f1/f | 0.598 | 0.626 | 0.626 | 0.669 |
| (5) | \|f2/f\| | 0.432 | 0.465 | 0.457 | 0.560 |
| (6) | f3/f | 0.450 | 0.435 | 0.426 | 0.456 |
| (7) | \|f4/f\| | 0.838 | 1.295 | 0.626 | 0.868 |
| (8) | \|(1 − β4a) × β4b\| | 1.356 | 1.390 | 1.412 | 1.353 |
| (9) | ν 4ac | — | — | — | — |

From the above-mentioned data, it can be understood that all the imaging lenses of Examples 1 to 8 are imaging lenses that satisfy Conditional Expressions (1) to (9), are small in size, satisfactorily correct various aberrations from focusing of the infinite object to focusing of the closest object of which the imaging magnification is set to be around an equal magnification, and have high vibration-proof performance in the entire imaging region.

Figure 33:
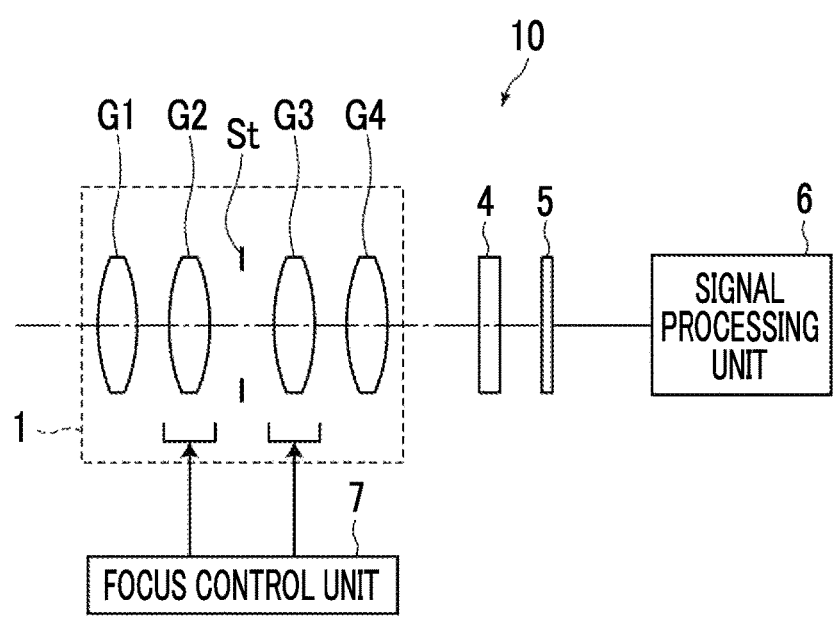
FIG. 33 is a schematic configuration diagram of an imaging apparatus according to an embodiment of the present invention.

Next, an imaging apparatus according to an embodiment of the present invention will be described. FIG. 33 shows a schematic configuration diagram of an imaging apparatus 10 using an imaging lens 1 according to an embodiment of the present invention, as an example of the imaging apparatus according to an embodiment of the present invention. Examples of the imaging apparatus 10 include electronic cameras such as a motion-picture camera, a broadcast camera, a digital camera, a video camera, and a surveillance camera.

The imaging apparatus 10 includes the imaging lens 1, a filter 4 disposed on the image side of the imaging lens 1, an imaging device 5, a signal processing unit 6 that arithmetically processes an output signal from the imaging device 5, and a focus controller 7 for focusing the imaging lens 1. FIG. 33 conceptually shows a first lens group G1, a second lens group G2, an aperture stop St, a third lens group G3, and a fourth lens group G4 which are included in the imaging lens 1. The imaging device 5 captures an image of a subject formed by the imaging lens 1 to convert the captured image into an electrical signal, and, for example, a charge coupled device (CCD), a complementary metal oxide semiconductor (CMOS) or the like can be used as the imaging device. The imaging device 5 is disposed so that the imaging surface thereof is coincident with the image plane of the imaging lens 1.

Hereinbefore, the present invention has been described through embodiments and examples, but the present invention is not limited to the above-described embodiments and examples, and can be variously modified. For example, the curvature radius, the surface spacing, the refractive index, the Abbe number, the aspherical coefficient, and the like of each lens are not limited to the values shown in each of the numerical value examples, and other values can be used therefor.

For example, the above example illustrates the lens system in which focusing from an infinite object to a short-distance object is performed, but it goes without saying that the present invention can be applied to an imaging lens in which focusing from a finite long-distance object to a short-distance object is performed.

In addition, the imaging apparatus according to an embodiment of the present invention is also not limited to the above examples, and can be replaced with various aspects.

EXPLANATION OF REFERENCES

1: imaging lens
4: filter
5: imaging device
6: signal processing unit
7: focus control unit
10: imaging apparatus
G1: first lens group
G2: second lens group
G3: third lens group
G4: fourth lens group
G4a: fourth-a lens group
G4b: fourth-b lens group
L1a to L4bc: lens
PP: optical member
Sim: image plane
St: aperture stop
Z: optical axis

What is claimed is:

1. An imaging lens comprising, in order from an object side:
   a first lens group having a positive refractive power;
   a second lens group having a negative refractive power;
   a third lens group having a positive refractive power; and
   a fourth lens group having a negative refractive power,
   wherein during focusing from an infinite object to a closest object, the first lens group remains stationary with respect to an image plane, the second lens group moves to an image side, the third lens group moves to the object side, and the fourth lens group remains stationary with respect to the image plane,
   the fourth lens group consists of a fourth-a lens group and a fourth-b lens group in order from the object side, and corrects blurring of an image on the image plane by moving the fourth-a lens group in a direction perpendicular to an optical axis, and
   in a case where a focal length of the fourth-a lens group is set to f4a, and a focal length of the whole system during focusing of the infinite object is set to f, the following Conditional Expression (1) is satisfied;

$$0.25 < |f4a/f| < 0.45 \tag{1}.$$

2. The imaging lens according to claim 1,
   wherein the fourth-a lens group includes a cemented lens which is formed by cementing a positive lens and a negative lens together in this order from the object side, and
   in a case where an Abbe number of the negative lens of the fourth-a lens group in a d line is set to ν4ab, and an Abbe number of the positive lens of the fourth-a lens group in a d line is set to ν4aa, the following Conditional Expression (2) is satisfied;

$$18 < \nu 4ab - \nu 4aa < 35 \tag{2}.$$

3. The imaging lens according to claim 1,
   wherein, in order from the object side, the first lens group consists of a first-a lens having a positive refractive power, a first-b lens having a positive refractive power, a first-c lens having a negative refractive power, and a first-d lens having a positive refractive power, and in a case where an Abbe number of the first-b lens in a d line is set to v1b, and an Abbe number of the first-c lens in a d line is set to v1c, the following Conditional Expression (3) is satisfied;

$$35<v1b-v1c<50 \qquad (3).$$

4. The imaging lens according to claim 1, wherein in a case where a focal length of the first lens group is set to f1, the following Conditional Expression (4) is satisfied;

$$0.5<f1/f<0.7 \qquad (4).$$

5. The imaging lens according to claim 1, wherein in a case where a focal length of the second lens group is set to f2, the following Conditional Expression (5) is satisfied;

$$0.35<|f2/f|<0.6 \qquad (5).$$

6. The imaging lens according to claim 1, wherein in a case where a focal length of the third lens group is set to f3, the following Conditional Expression (6) is satisfied;

$$0.4<f3/f<0.5 \qquad (6).$$

7. The imaging lens according to claim 1, wherein in a case where a focal length of the fourth lens group is set to f4, the following Conditional Expression (7) is satisfied;

$$0.5<|f4/f|<2 \qquad (7).$$

8. The imaging lens according to claim 1, wherein in a case where a lateral magnification of the fourth-a lens group during focusing of the infinite object is set to β4a, and a lateral magnification of the fourth-b lens group during focusing of the infinite object is set to β4b, the following Conditional Expression (8) is satisfied;

$$1<|(1-\beta 4a)\times 4b|<2 \qquad (8).$$

9. The imaging lens according to claim 1, wherein, in order from the object side, the fourth-a lens group consists of a cemented lens which is formed by cementing a fourth-aa lens having a positive refractive power and a fourth-ab lens having a negative refractive power together in this order from the object side, and a fourth-ac lens having a negative refractive power.

10. The imaging lens according to claim 9, wherein in a case where an Abbe number of the fourth-ac lens in a d line is set to v4ac, the following Conditional Expression (9) is satisfied;

$$60<v4ac<100 \qquad (9).$$

11. The imaging lens according to claim 1, wherein the following Conditional Expression (1-1) is satisfied;

$$0.29<|f4a/f|<0.42 \qquad (1\text{-}1).$$

12. The imaging lens according to claim 2, wherein the following Conditional Expression (2-1) is satisfied;

$$27<v4ab-v4aa<35 \qquad (2\text{-}1).$$

13. The imaging lens according to claim 4, wherein the following Conditional Expression (4-1) is satisfied;

$$0.55<f1/f<0.67 \qquad (4\text{-}1).$$

14. The imaging lens according to claim 5, wherein the following Conditional Expression (5-1) is satisfied;

$$0.38<|f2/f|<0.57 \qquad (5\text{-}1).$$

15. The imaging lens according to claim 6, wherein the following Conditional Expression (6-1) is satisfied;

$$0.42<f3/f<0.5 \qquad (6\text{-}1).$$

16. The imaging lens according to claim 7, wherein the following Conditional Expression (7-1) is satisfied;

$$0.6<|f4/f|<1.5 \qquad (7\text{-}1).$$

17. The imaging lens according to claim 8, wherein the following Conditional Expression (8-1) is satisfied;

$$1.3<|(1-\beta 4a)\times \beta 4b|<1.6 \qquad (8\text{-}1).$$

18. The imaging lens according to claim 10, wherein the following Conditional Expression (9-1) is satisfied;

$$70<v4ac<100 \qquad (9\text{-}1).$$

19. An imaging apparatus comprising the imaging lens according to claim 1.

* * * * *